United States Patent [19]

Mitsutake et al.

[11] Patent Number: 5,446,510
[45] Date of Patent: Aug. 29, 1995

[54] IMAGE DISPLAY APPARATUS

[75] Inventors: Hideaki Mitsutake, Tokyo; Nobuo Minoura, Yokohama; Kazumi Kimura, Atsugi; Katsumi Kurematsu, Kawasaki, all of Japan

[73] Assignee: Canon Kabushiki Kaisha, Tokyo, Japan

[21] Appl. No.: 328,406

[22] Filed: Oct. 24, 1994

Related U.S. Application Data

[63] Continuation of Ser. No. 104,278, Aug. 10, 1993, abandoned, which is a continuation of Ser. No. 630,271, Dec. 19, 1990, abandoned.

[30] Foreign Application Priority Data

Dec. 20, 1989 [JP] Japan .................. 1-330033
Jul. 20, 1990 [JP] Japan .................. 2-192677

[51] Int. Cl.$^6$ ............................. G03B 21/28
[52] U.S. Cl. ...................... 353/20; 353/34; 359/40
[58] Field of Search ............... 353/122, 31, 30, 33, 353/34, 37, 20, 81; 359/63, 93, 485, 490, 494–496, 638, 629

[56] References Cited

U.S. PATENT DOCUMENTS

| | | | |
|---|---|---|---|
| 2,958,258 | 11/1960 | Kelly | 353/20 |
| 3,510,198 | 5/1970 | Pace | 350/394 |
| 3,677,621 | 7/1972 | Smith | 350/394 |
| 4,127,322 | 11/1978 | Jacobson et al. | 353/34 |
| 4,191,456 | 3/1980 | Houg et al. | 353/31 |
| 4,560,999 | 12/1985 | Tokuhara | 346/160 |
| 4,864,390 | 9/1989 | McKechnie et al. | 358/60 |
| 4,913,529 | 4/1990 | Goldenberg et al. | 350/337 |
| 4,969,730 | 11/1990 | van Den Brandt | 353/34 |
| 4,989,076 | 1/1991 | Owada et al. | 358/61 |
| 4,995,718 | 2/1991 | Jachimowicz et al. | 353/33 |
| 5,028,121 | 7/1991 | Baur et al. | 353/31 |
| 5,042,921 | 8/1991 | Sato et al. | 359/63 |
| 5,200,843 | 4/1993 | Karasawa et al. | 353/20 |
| 5,381,278 | 1/1995 | Shingaki et al. | 353/20 |
| 5,387,953 | 2/1995 | Minoura et al. | 353/34 |
| 5,387,991 | 2/1995 | Mitsutake et al. | 359/40 |

FOREIGN PATENT DOCUMENTS

| | | | |
|---|---|---|---|
| 1372436 | 10/1964 | France . | |
| 152212 | 11/1981 | Germany . | |
| 3515608 | 11/1985 | Germany . | |
| 3829598 | 3/1990 | Germany . | |
| 61-90584 | 5/1986 | Japan . | |
| 63-39294 | 2/1988 | Japan . | |
| 63-168622 | 7/1988 | Japan . | |
| 63-182987 | 7/1988 | Japan . | |
| 63-185188 | 7/1988 | Japan . | |
| 0239084 | 2/1990 | Japan | 359/40 |
| 3221917 | 9/1991 | Japan | 359/40 |

OTHER PUBLICATIONS

Patent Abstracts Of Japan vol. 10, No. 268, Sep. 12, 1986.
OPTIK, vol. 13, No. 4, 1956, pp. 158–168.
Applied Optics, vol. 19, No. 12, Jun. 1980, pp. 2046–2047.

*Primary Examiner*—William A. Cuchlinski, Jr.
*Assistant Examiner*—William C. Dowling
*Attorney, Agent, or Firm*—Morgan & Finnegan

[57] ABSTRACT

An image display apparatus has a radiation source, generator for generating an image by modulating a polarized light beam and directing device for directing a light beam from the radiation source toward the generator. The directing device has a conversion optical system for converting the beam from the radiation source into the polarized light beam. The conversion optical system has a polarizing beam splitter for splitting the beam from the radiation source into a first and second beams. In the conversion optical system, a ¼ wavelength plate and a mirror are arranged so that the plane of polarization of the first beam is rotated to generate a third beam with the plane of polarization same as that of the second beam. The third beam is directed toward the generator through the polarizing beam splitter while the second beam is also directed toward the generator.

30 Claims, 12 Drawing Sheets

REFLECTIVITY OF ALUMINUM

REFLECTIVITY OF OPTICAL MULTI-LAYER FILM

TOTAL REFLECTIVITY

IMAGE DISPLAY APPARATUS

This is a continuation of application Ser. No. 08/104,278, filed Aug. 10, 1993, now abandoned, which is a continuation of application Ser. No. 07/630,271 filed Dec. 19, 1990, now abandoned.

BACKGROUND OF THE INVENTION

1. Field of the Invention

The present invention relates to an image display apparatus.

2. Related Background Art

FIG. 1 is a schematic view showing the principal structure of an example of the conventional image display apparatus.

Said display apparatus is provided with a light source 1 composed for example of a halogen lamp or a metal halide lamp; a mirror 2 reflecting a part of the light emitted by said light source 1; a heat ray cut-off filter 3 for absorbing or reflecting the heat ray in the light entering directly from the light source 1 or indirectly from the mirror 2; a condenser lens 4 for converting the light, after removal of the heat ray, into a parallel beam; a polarizer 5 for converting said parallel light beam into linearly polarized light; a liquid crystal light valve 7 for modulating said linearly polarized light according to an image signal; a polarizer 8 for transmitting only a component, parallel to the transmission axis thereof, of said modulated linearly polarized light; and a projection lens 10 for projecting the linearly polarized light, transmitted by said polarizer 8, in a magnified scale onto an unrepresented screen.

FIG. 2 is a schematic view showing the principal part of another example of such conventional projection display apparatus.

Said apparatus is equipped with two polarizing beam splitters 6, 9 respectively in front of and behind the light crystal light valve 7, in place for the two polarizers 5, 8 in the apparatus shown in FIG. 1.

The projection display apparatus shown in FIGS. 1 and 2 are associated with a drawback that the efficiency of ulitization of light does not exceed 50%, since, within the light emitted by the light source 1, a linearly polarized component transmitted by the polarizing beam splitter 6 alone is utilized for illuminating the light crystal light valve 7 while the perpendicularly polarized component is lost.

FIG. 3 shows a projection display apparatus disclosed in the Japanese Patent Application Laid-Open No. 61-90584 for rectifying said drawback.

In said projection display apparatus the parallel light beam emerging from the condenser lens 4 enters a polarizing beam splitter 11, and the P-polarized component $L_p$ is transmitted by the functional plane (an evaporated film formed on a diagonal plane between two rectangular prisms) 11a of said polarizing beam splitter 11, while the S-polarized component $L_s$ is perpendicularly reflected to enter a total reflection prism 12. Being perpendicularly reflected again in said prism 12, the S-polarized component $L_s$ emerges from said prism 12 in a direction same as that of the P-polarized component $L_p$. The S-polarized component $L_s$ is polarized in a direction parallel to the functional plane 11a of the polarizing beam splitter 11, and the P-polarized component $L_p$ is polarized in a direction perpendicular to that of the S-polarized component.

At the exit side of the total reflection prism 12 there is provided a λ/2-phase shifting plate 13, whereby said S-polarized component $L_2$ is subjected to a rotation of the polarizing direction by 90° and is converted into a P-polarized component $L_p{}^*$. Also at the exit side of the polarizing beam splitter 11 and the λ/2-phase shifting plate 13 there are respectively provided wedge-shaped lenses 14, 15 for light path deflection, whereby the P-polarized component $L_p$ transmitted by said polarizing beam splitter 11 and the P-polarized component $L_p{}^*$ converted by the λ/2-phase shifting plate 13 are subjected to light path deflection and mutually cross at a point $P_0$ on the entrance face of the liquid crystal light valve 7, thereby providing a synthesized light.

Consequently such projection display apparatus can illuminate the liquid crystal light valve 7 with both the S-polarized component $L_s$ and the P-polarized component $L_p$ separated by the polarizing beam splitter 11 and can therefore double the efficiency of light utilization in comparison with the apparatus shown in FIG. 2.

However, in the projection display apparatus disclosed in the above-mentioned Japanese Patent Application Laid-Open No. 61-90584, since the P-polarized component $L_p$ and the P-polarized component $L_p{}^*$ converted by the λ/2-phase shifting plate 13 respectively enter the liquid crystal light valve with an angle $\theta$ as shown in FIG. 3, it is necessary to select a considerably large distance from the wedge-shaped lenses 14, 15 to the liquid crystal light valve 7 in order to reduce said incident angle $\theta$ if the light valve 7 shows significant deterioration of characteristics depending on the incident angle.

For avoiding such drawback, there is conceived a parallel illuminating method in which the wedge-shaped lenses 14, 15 shown in FIG. 3 are removed, whereby said P-polarized component $L_p$ and said converted P-polarized component $L_p{}^*$ enter the liquid crystal light valve 7 in mutually parallel state. However, such parallel illumination method, if applied to the projection display apparatus disclosed in the Japanese Patent Application Laid-Open No. 61-90584, cannot provide the expected result because the P-polarized component $L_p$ and the converted P-polarized component $L_p{}^*$ are not complete unless the light source 1 is a complete point or linear source providing completely parallel beams from the condenser lens 4. This will be explained further with reference to FIG. 4.

In case the light from a light source 1 with a finite diameter $\phi$ is condensed by a condenser lens 4 at a distance l, the light emerging therefrom is not completely parallel but is spread within an angular range $2\omega(\omega = \tan^{-1}((\phi/2)/l))$. A ray $\alpha$ contained in thus obtain non-parallel beam enters the λ/2-phase shifting plate 13 without the function of the polarizing beam splitter 11 and emerges from said phase shifting plate 13 with the P- and S-polarized components. Also a ray $\beta$ is converted by the polarizing beam splitter 11 into the S-polarized component $L_s$, which is then reflected by the total reflection prism 12 and reflected again by the polarizing beam splitter 11. It thus emerges as a P-polarized component $L_p{}^*$ from another position of the λ/2-phase shifting plate 13 as indicated by a ray $\beta_1$, or is lost by absorption or transmission at the surface of the phase shifting plate 13 as indicated by a ray $\beta_2$.

SUMMARY OF THE INVENTION

In consideration of the foregoing, the object of the present invention is to provide an image display apparatus equipped with an improved polarized illuminating device capable of reducing the loss in the amount of light.

The above-mentioned object can be attained, according to a first embodiment of the present invention, by an image display apparatus comprising:

a radiation source;

a generator for generating an image by modulating a polarized light beam; and directing means for directing a light beam from said radiation source toward said generator;

wherein said directing means has a conversion optical system for converting the beam from said radiation source into said polarized light beam;

said conversion optical system comprises a polarizing beam splitter for splitting the beam from said radiation source into a first beam and a second beam whose polarization planes are orthogonal to each other; and an arrangement of a ¼ wavelength plate and a mirror for rotating the polarization plane of said first beam to generate a third beam whose polarization plane is same as that of the second beam;

whereby said third beam is directed toward said generator through said polarizing beam splitter while said second beam is also directed toward said generator.

Also the above-mentioned object can be attained, according to a second embodiment of the present invention, by an image display apparatus comprising:

a radiation source;

a generator for generating an image by modulating a polarized light beam; and directing means for directing a light beam from said radiation source toward said generator;

wherein said directing means comprises a collimator for substantially collimating the beam from said radiation source and a conversion optical system for converting thus collimated beam into said polarized beam; and said conversion optical system comprises a polarizing beam splitter with a splitting plane inclined to the optical axis of said collimator, for splitting said collimated beam by transmitting a P-polarized beam thereof while reflecting an S-polarized beam thereof; an arrangement of a ¼ wavelength plate and a mirror for rotating the polarization plane of said S-polarized beam to generate a polarized beam with a polarized plane coinciding with that of said P-polarized beam and directing said generated polarized beam toward a predetermined direction through said polarizing beam splitter; and an auxiliary mirror for reflectively deflecting said P-polarized beam toward said predetermined direction.

Also the above-mentioned object can be attained, according to a third embodiment of the present invention, by an image display apparatus comprising:

a radiation source;

a generator for generating an image by modulating a polarized light beam; and directing means for directing a light beam from said radiation source toward said generator;

wherein said directing means comprises a collimator for substantially collimating the beam from said radiation source and a conversion optical system for converting thus collimated beam into said polarized beam; and said conversion optical system comprises a first polarizing beam splitter with a splitting plane inclined to the optical axis of said collimator, for splitting said collimated beam by transmitting a P-polarized beam thereof while reflecting an S-polarized beam thereof in a predetermined direction; a second polarizing beam splitter with a splitting plane inclined to the optical axis of said collimator; and an arrangement of a ¼ wavelength plate and a mirror for receiving said P-polarized beam through said second polarizing beam splitter, rotating the polarization plane of said P-polarized beam to generate a polarized beam with a polarization plane coinciding with that of said S-polarized beam and reflectively deflecting said generated polarized beam into said predetermined direction through said second polarizing beam splitter.

Also the above-mentioned object can be attained, according to a fourth embodiment of the present invention, by an image display apparatus comprising:

a radiation source;

a generator for generating an image by modulating a polarized light beam; and directing means for directing a light beam from said radiation source toward said generator;

wherein said directing means comprises a collimator for substantially collimating the beam from said radiation source and a conversion optical system for converting thus collimated beam into said polarized beam; and said conversion optical system comprises a polarizing beam splitter with a splitting plane inclined to the optical axis of said collimator, for splitting said collimated beam by transmitting a P-polarized beam thereof into a predetermined direction while reflecting an S-polarized beam thereof; an arrangement of a ¼ wavelength plate and a mirror for rotating the polarization plane of said S-polarized beam to generate a polarized beam with a polarization plane coinciding with that of said P-polarized beam and directing said generated polarized beam toward said polarizing beam splitter; and an auxiliary mirror for receiving said polarized beam through said polarizing beam splitter and reflectively deflecting said polarized beam into said predetermined direction.

DETAILED DESCRIPTION OF THE PREFERRED EMBODIMENTS

Now the present invention will be clarified in greater detail by embodiments thereof shown in the attached drawings.

Figure 5:
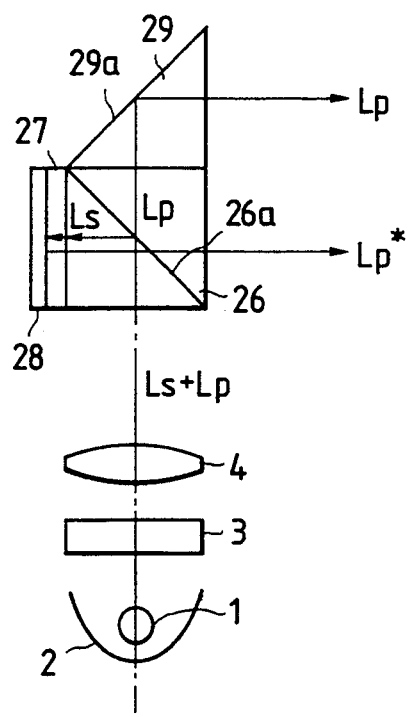
FIG. 5 is a view of a first embodiment of the polarized illuminating apparatus of the present invention.
Figure 6:
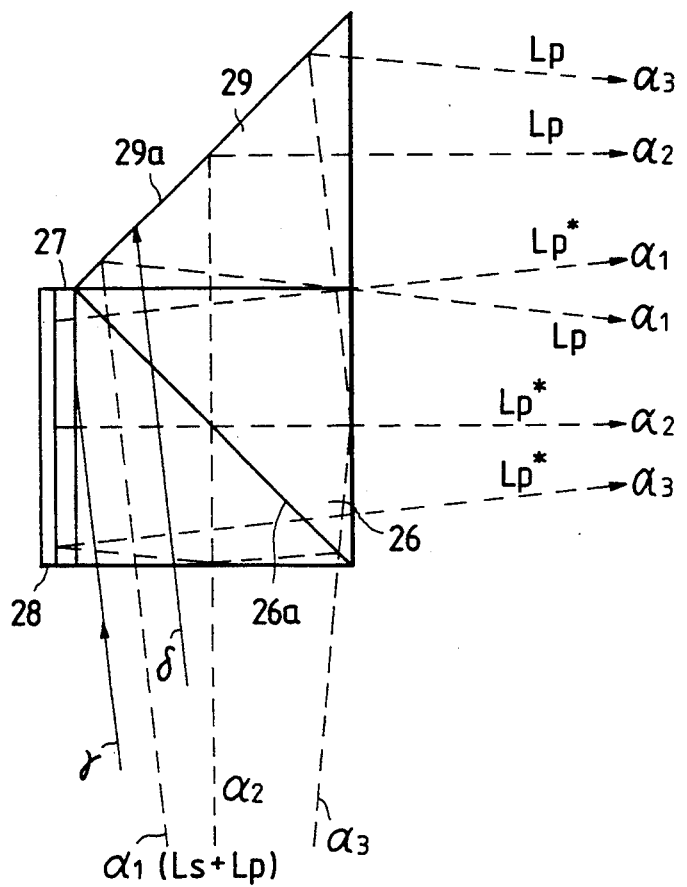
FIG. 6 is a schematic view showing the optical path in the polarized illuminating apparatus shown in FIG. 5.

FIG. 5 is a schematic view of a first embodiment of the polarized illuminating apparatus of the present invention, and FIG. 6 is a view showing the optical path thereof.

Said polarized illuminating apparatus is composed of a polarizing beam splitter 26 having a function plane (an evaporated film formed on a diagonal plane at which two rectangular prisms are mutually adhered) for transmitting the P-polarized component $L_p$ of a parallel light beam emerging from a condenser lens 4 while rectangularly reflecting the S-polarized component $L_s$; a total relfection prism 29 provided with a total reflection plane 29a contacting at an end thereof rectangularly with an end of the functional plane 26a of said polarizing beam splitter 26 and serving to rectangularly reflect said transmitted P-polarized component $L_p$; a $\lambda/4$ phase shifting plate 27 contacting at an end thereof, at an angle of 45°, with an end of the functional plane 26a of said polarizing beam splitter and with an end of the total reflection plane 29a of said total reflection prism 29, and adapted to receive said reflected S-polarized component $L_s$; and a reflecting plate 28 having a reflecting plane, composed of an aluminum evaporated film or an optical multi-layered film, adhered to said $\lambda/4$ phase shifting plate 27.

In said polarized illuminating apparatus, the parallel light beam emerging from the condenser lens 4 is split into the P-polarized component $L_p$ and the S-polarized component $L_s$, by respective transmission and rectangular reflection by the functional plane 26a of the polarizing beam splitter 26. Said reflected S-polarized component $L_s$ enters the $\lambda/4$ phase shifting plate 27, then reflected by the reflecting plane of the reflecting plate 28, and is again transmitted by the phase shifting plate 27, thereby subjected to a rotation of the plane of polarization by 90° and thereby converted into a P-polarized component $L_p^*$, which is transmitted by the functional plane 26a and emerges from the polarizing beam splitter 26. On the other hand, said transmitted P-polarized component $L_p$ is rectangularly reflected by the total reflection plane 29a of the total reflection prism 29, and emerges therefrom parallel to said converted P-polarized component $L_p^*$.

In this polarized illuminating apparatus, as indicated by rays $\alpha_1$, $\alpha_2$, $\alpha_3$, all the light entering the polarizing beam splitter 26 is received by the functional plane 26a thereof, and is split into the P-polarized component $L_p$ and the S-polarized component $L_s$. Also all the S-polarized component $L_s$ enters the phase shifting plate 27, thus being subjected to the rotation of plane of polarization. On the other hand, said P-polarized component $L_p$ scarcely enters the $\lambda/4$ phase shifting plate 27. Also with respect to an arbitrary ray, the P-polarized component $L_p$ energing from the total reflection prism 29 and the converted P-polarized component $L_p^*$ emerging from the polarizing beam splitter 26 are mutually symmetrical in the vertical direction. Consequently, even if the light beam entering the polarizing beam splitter 26 becomes unbalanced due for example to a positional shift of the light source 1, there will result no abrupt change in the illumination intensity at the junction point of said P-polarized component $L_p$ and said converted P-polarized component $L_p^*$. Also since said P-polarized component $L_p$ and said converted P-polarized component $L_p^*$ have a same optical path length, there can be prevented an imbalance in the illumination intensity resulting from uncollimated light. This is rendered possible by a structure in which the functional plane 26a of the polarizing beam splitter 26, the $\lambda/4$ phase shifting plate 27 and the total reflection plane 29a of the total reflection prism 29 are maintained in mutual contact with predetermined angles, and is not achievable in the conventional structure employing the $\lambda/2$ phase shifting plate 13 shown in FIG. 3, because the functional plane of the polarizing beam splitter 11 is parallel to the total reflection plane of the prism 12.

Also in the present polarized illuminating apparatus, at the entry into the polarizing beam splitter 26, a ray obliquely entering the $\lambda/4$ phase shifting plate 27, such as $\gamma$ in FIG. 6, may be lost by transmission or reflection by said phase shifting plate 27, but such loss can be prevented by forming, on the junction plane between the polarizing beam splitter 26 and the $\lambda/4$ shifting plate 27, an optical multi-layered film which reflects a ray of a large incident angle, such as $\gamma$, and transmits the normal ray with a small incident angle.

Also an incident ray entering the total reflection plane 29a of the prism 29 with an incident angle smaller than the total reflection angle, such as $\delta$ shown in FIG. 6, is partially lost in said P-polarized component $L_p$ due to partial transmission, but such loss can also be prevented by forming a multi-layered reflecting film or a metal reflecting film on the total reflection plane 29a.

As explained in the foregoing, the present polarized illuminating apparatus can improve the efficiency of light utilization, as the P-polarized component $L_p$ and the S-polarized component $L_s$ split by the polarizing beam splitter 26 can both be utilized for illuminating the light valve (not shown). Besides a remarkable improvement can be achieved in the balance of illumination intensity which has been a problem in the parallel illumination of the liquid crystal light valve (not shown) with said P-polarized component $L_p$ and said converted P-polarized component $L_p^*$, and there is also achieved a reduction in the distance between the polarized illuminating apparatus and the light valve, which has been difficult to achieve in the illuminating system with the synthesized light shown in FIG. 3. Thus the present invention enables compactization of the image display apparatus.

The total reflection prism 29 may be integrally formed with a rectangular prism, positioned next to said total reflection prism 29, of the polarizing beam splitter 26.

Figure 7:
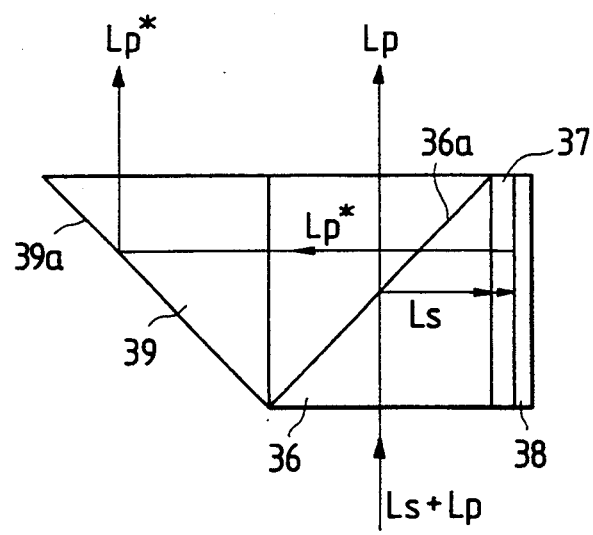
FIG. 7 is a view of a second embodiment of the polarized illuminating apparatus of the present invention.

FIG. 7 illustrates a second embodiment of the polarized illuminating apparatus of the present invention.

The present embodiment is different from that shown in FIG. 5 in that the P-polarized component $L_p$, transmitted by the functional plane 36a of a polarizing beam splitter 36 and immediately emerges therefrom, while the S-polarized component $L_s$ reflected by said functional plane 36a is converted into a P-polarized component $L_p^*$ by a $\lambda/4$ phase shifting plate 37 and a reflecting plate 38, then rectangularly reflected by the total reflection plane 39a of a total reflection prism 39 and emerges therefrom in parallel manner to said P-polarized component $L_p$.

Figure 1:
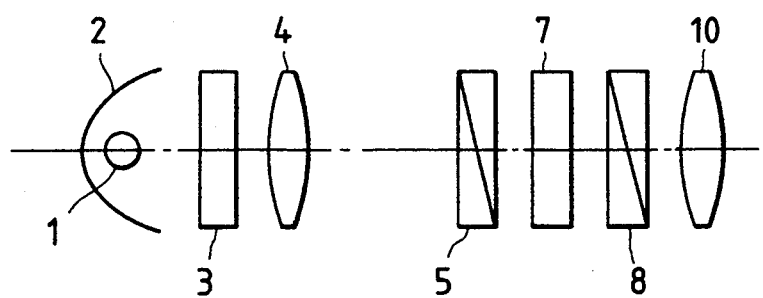
FIG. 1 is a schematic view showing the structure of an example of the conventional projection display apparatus.

In this polarized illuminating apparatus, the direction of the emerging light can be made same as that of the incident light, without addition of other optical components. The P-polarized component and the converted P-polarized component $L_p^*$ have mutually different optical path lengths, but can provide same advantages as those in the apparatus shown in FIG. 1.

The total reflection prism 39 may be formed integrally with a rectangular prism, positioned next to said total reflection prism 39, of the polarizing beam splitter 36.

Figure 8:
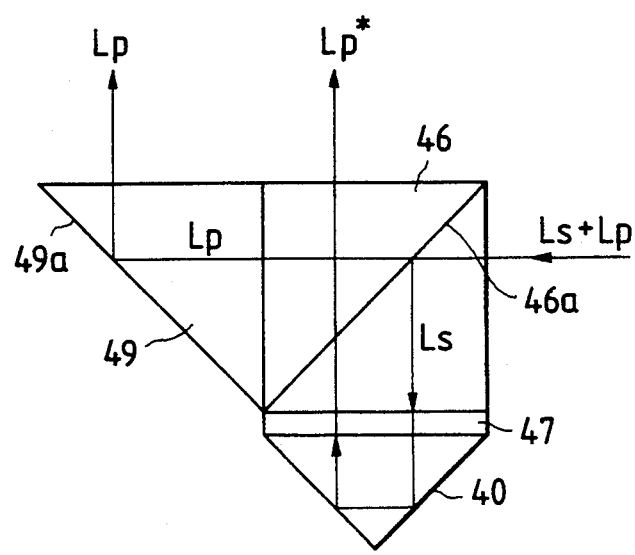
FIG. 8 is a view of a third embodiment of the polarized illuminating apparatus of the present invention.

FIG. 8 illustrates a third embodiment of the polarized illuminating apparatus of the present invention.

In the present embodiment, the reflecting plate 28 in FIG. 5 is replaced by a rectangular prism 40, for reflecting the S-polarized component $L_s$, reflected by the functional plane 46a of a polarizing beam splitter 46, without formation of an unnecessary polarized component.

In the present embodiment, said S-polarized component $L_s$ is laterally inverted with respect to the central axis thereof, then enters a $\lambda/4$ phase shifting plate 47 from the rectangular prism 40, and is converted into the P-polarized component $L_p^*$. Consequently said converted P-polarized component $L_p^*$ and the P-polarized component $L_p$ emerging from a total reflection prism 49 lack the symmetry explained in the apparatus shown in FIG. 1, so that the illumination intensity distribution tends to become unbalanced when the light bean entering the polarizing beam splitter 46 is unbalanced. Also the P-polarized component $L_p$ emerging from the total reflection prism 49 and the converted P-polarized component $L_p^*$ emerging from the polarizing beam splitter 46 have mutually different optical path lengths, so that the use of uncollimated light may pose a problem. However the present embodiment provides other advantages same as those in the apparatus shown in FIG. 1.

The total reflection prism 49 may be formed integrally with a rectangular prism, positioned next to said total reflection prism 49, of the polarizing beam splitter 46.

Figure 9:
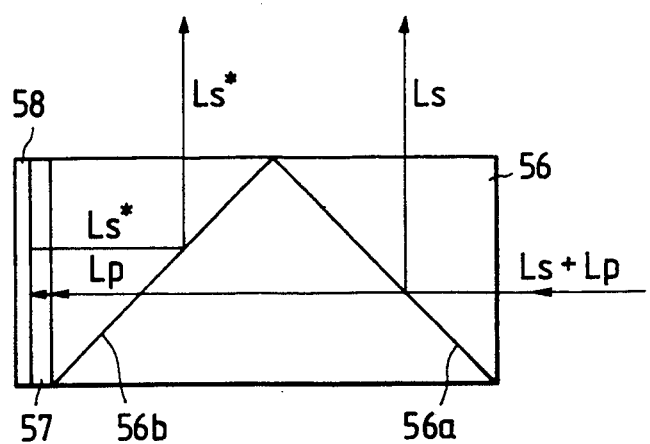
FIG. 9 is a view of a fourth embodiment of the polarized illuminating apparatus of the present invention.

FIG. 9 illustrates a fourth embodiment of the polarized illuminating apparatus of the present invention.

The polarized illuminating apparatus of the present embodiment is composed of a polarizing beam splitter 56 having a first functional plane 56a (an evaporated film formed on one of two diagonal planes for jointing three rectangular prisms) for transmitting the P-polarized component $L_p$ of incident light beam and perpendicularly reflecting the S-polarized component thereof, and a second functional plane 56b (an evaporated film formed on the other of said two diagonal planes) contacting at an end thereof rectangularly with said first functional plane 56a; a $\lambda/4$ phase shifting plate 57 contacting at an end thereof, with an angle of 45°, with the other end of said second functional plane and adhered to a face of the polarizing beam splitter 56 opposite to the entrance face thereof; and a reflecting plate 58 having a reflecting plane adhered to said $\lambda/4$ phase shifting plate 57.

Among a parallel incident beam from a condenser lens (not shown), the S-polarized component $L_s$ is reflected by the first functional plane 56a of the polarizing beam splitter 56 and immediately emerges therefrom. The P-polarized component $L_p$ is transmitted by the first and second functional planes 56a, 56b of the polarizing beam splitter 56 and enters the $\lambda/4$ phase shifting plate 57. Said component is converted into the S-polarized component $L_s^*$ by a rotation of the plane of polarization by 90° in the phase shifting plate 57 and the reflecting plate 58, then perpendicularly reflected by the second functional plane 56b of the polarizing beam splitter 56, and emerges therefrom in a direction same as that of the above-mentioned S-polarized component $L_s$.

The present embodiment is not suitable for uncollimated light because said S-polarized component $L_s$ and said converted S-polarized component $L_s^*$ have mutually different optical path lengths, but provide other advantages same as those in the apparatus shown in FIG. 5. Also the apparatus of the present embodiment may be utilized as an analyzer in an image display apparatus utilizing a liquid crystal light valve (as will be explained later), because of absence of the phase shifting plate 57 and the reflecting plate 58 at the side opposite to the entrance side.

In the following there will be explained an embodiment of the image display apparatus obtained by combining the polarized illuminating apparatus of the present invention with other optical components.

Figure 10:
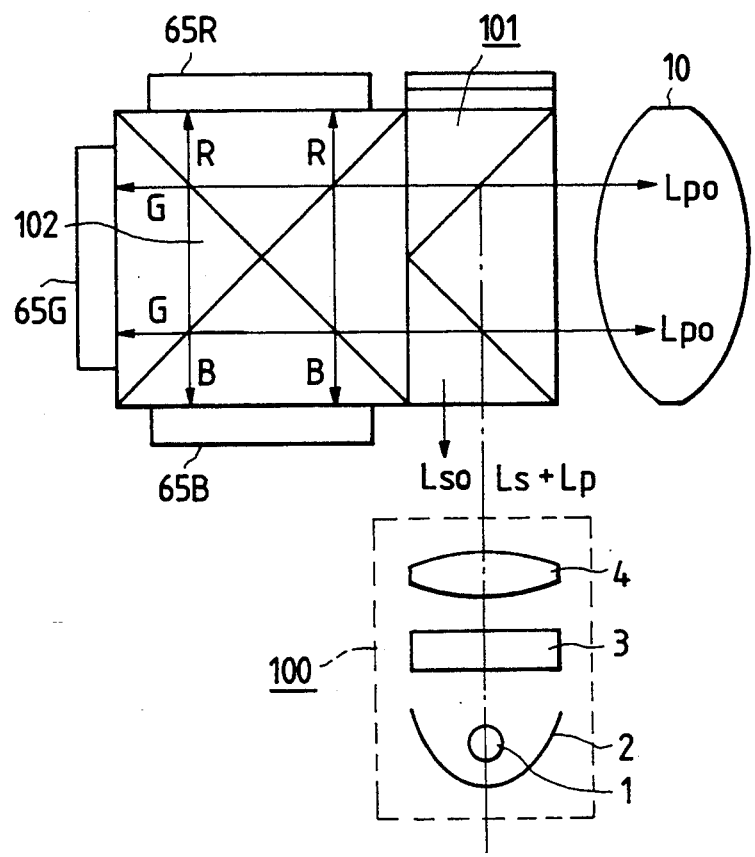
FIG. 10 is a partial view of an embodiment of a projection display apparatus provided with the polarized illuminating apparatus shown in FIG. 9.

FIG. 10 is a schematic view showing the principal part of an embodiment of the projection display apparatus utilizing the polarized illuminating apparatus shown in FIG. 9.

As shown in FIG. 10, said projection display apparatus is provided with a light source unit 100 comprising a light source 1, a reflection mirror 2, a heat ray cut-off filter 3 and a condenser lens 4; a polarized illuminating apparatus 101 shown in FIG. 9; a cross dichroic prism 102 adhered at a face thereof to the exit face of said polarized illuminating apparatus 101 and bearing reflective liquid crystal light valves 65R, 65G, 65B for red, green and blue colors respectively on other three faces; and a projection lens 10 positioned opposed to the exit face of the polarized illuminating apparatus 101.

Among a white parallel light beam emerging from the light source unit 100, the S-polarized component $L_s$ is perpendicularly reflected by a first functional plane 56a of a polarizing beam splitter 56 constituting the polarized illuminating apparatus 101 (cf. FIG. 9), and enters the cross dichroic prism 102. Also the P-polarized component $L_p$ is converted into an S-polarized component $L_s^*$ by the $\lambda/4$ phase shifting plate 57 and the reflecting plate 58 as explained before, then perpendicularly reflected by the second functional plane 56b of the polarizing beam splitter 56 (cf. FIG. 9) and enters the cross dichroic prism 102. Thus, said white parallel light beam is directed to the cross dichroic prism 102 after conversion into a linearly polarized beam, consisting of S-polarized components $L_s$, $L_s$*, in the polarized illuminating apparatus 101.

Said linearly polarized beam is split by the cross dichroic prism 102 into red, green and blue light beams R, G, B, which are respectively projected toward the reflective liquid crystal light valves 65R, 65G, 65B for red, green and blue colors. The liquid crystal used in said light valves is of ECB (electrically controlled birefringence) type or 45° TN (twisted nematic) type, and has a property of rotating the plane of polarization of the incident light, depending on the voltage applied according to image signals. Consequently, the light incident to the reflective light crystal light valves 65R, 65G, 65B is linearly polarized light composed of S-polarized components, but the reflected light contains a P-polarized component according to the image signal in each pixel. The reflected light beams are synthesized in the cross dichroic prism 102 and return to the polarized illuminating apparatus 101. In said apparatus 101, a pair of functional planes of the polarizing beam splitter 56 (FIG. 9) function as an analyzer, whereby the P-polarized component $L_{po}$ in said synthesized reflected light is transmitted and projected onto a screen (not shown) through the projection lens 10. A part of the S-polarized component $L_{so}$ in said synthesized reflected light, entering the first functional plane 56a of the polarizing beam splitter 56 is perpendicularly reflected by said functional plane 56a and returns to the light source unit 100. Also another part of said S-polarized component $L_{so}$, entering the second functional plane 56b of the polarizing beam splitter 56 is perpendicularly reflected by said functional plane, then is converted into a P-polarized component by the λ/4 phase shifting plate 57 and the reflecting plate 58, then transmitted by the second and first functional planes 56b, 56a and returns to the light source unit 100. Consequently, in the present polarized illuminating apparatus, the polarizing beam splitter 56 functions as a complete analyzer.

The above-explained projection display apparatus provides advantages of improving the efficiency of light utilization since the white parallel light beam from the light source unit 100 can be converted, without loss, into a linearly polarized beam by the polarized illuminating apparatus 100, and significantly reducing the rear-focus length of the projection lens in comparison with that in the conventional projection display apparatus, because of separation and synthesis of beams of different colors by means of the cross dichroic prism 102, thereby expanding the design freedom of the projection lens 10 and compactizing the entire display apparatus. There is also provided another advantage that the polarized illuminating apparatus 101 can be utilized as an analyzer.

Figure 11A:
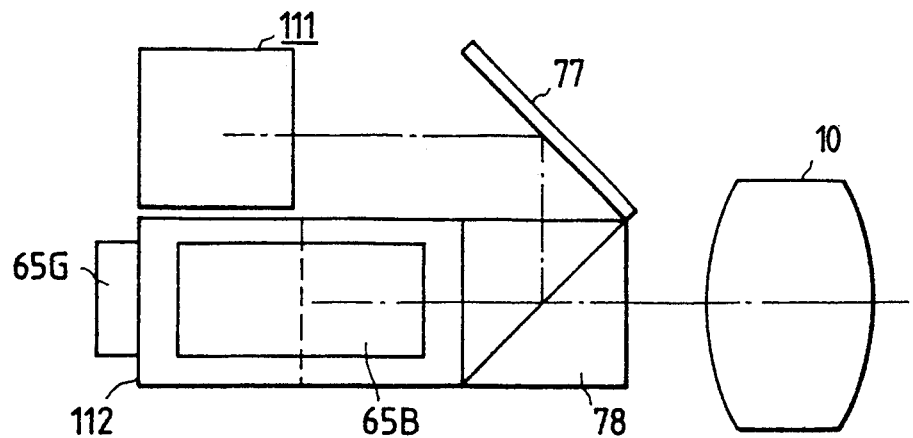
FIGS. 11A and 11B are respectively a lateral view and a plan view of an embodiment of a projection display apparatus provided with the polarized illuminating apparatus shown in FIG. 5.
Figure 11B:
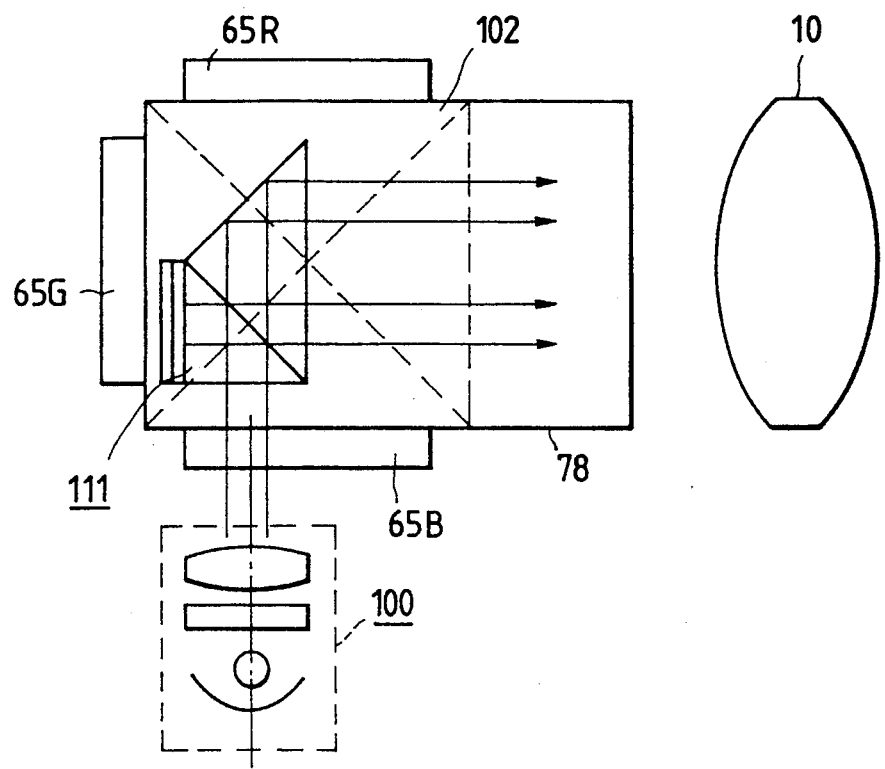

FIGS. 11A and 11B are respectively a side view and a plan view of an embodiment of the projection display apparatus utilizing the polarized illuminating apparatus shown in FIG. 5.

This projection display apparatus is provided with a light source unit 100; a polarized illuminating apparatus 111 shown in FIG. 5; a mirror 77 for perpendicularly reflecting the light beam from said polarized illuminating apparatus 111 downwards; a polarizing beam splitter 78 for perpendicularly reflecting the S-polarized component of the beam reflected by said mirror 77 toward the polarized illuminating apparatus 111 while transmitting the P-polarized component; a cross dichroic prism 102 adhered on a lateral face thereof to the exit face of said S-polarized component of the polarized beam splitter 78 and having reflective liquid crystal light valves 65R, 65G, 65B for red, green and blue colors on three other lateral faces; and a projection lens 10 positioned opposite to the side of the cross dichroic prism 112 with respect to the polarized beam splitter 78.

A white parallel light beam emitted from the light source unit 100 enters the polarized illuminating apparatus 111, and the P-polarized component of said white parallel beam and the converted P-polarized component obtained from the λ/4 phase shifting plate 27 and the reflecting plate 28 (both P-polarized components being hereinafter collectively called P-polarized beam) enter the mirror 77. Said P-polarized beam is totally reflected by the mirror 77 and enters the polarizing beam splitter 78. As the plane of polarization of said P-polarized beam is S-polarized plane to the functional plane of the polarizing beam splitter 78, said beam is reflected by said plane and enters the cross dichroic prism 102. In said prism, the P-polarized beam behaves in the same manner as in the cross dichroic prism shown in FIG. 10, and the reflected light beams, modulated by the reflective liquid crystal light valves 65R, 65G, 65B according to an image signal enter the polarizing beam splitter 78, which functions as an analyzer, as in the polarized illuminating apparatus 10 shown in FIG. 10. Thus the components, transmitted by said polarizing beam splitter 78, of the reflected light beams are projected through the projection lens 10 onto a screen (not shown) to form an image thereon.

As explained above, the projection display apparatus of the present embodiment provides, as in the apparatus shown in FIG. 10, advantages of improvement in the efficiency of light utilization, expansion of design freedom of the projection lens 10, and compactization of the entire structure.

The present embodiment employs the polarized illuminating apparatus shown in FIG. 5, but the apparatus shown in FIGS. 7 or 8 may naturally be employed likewise.

Figure 2:
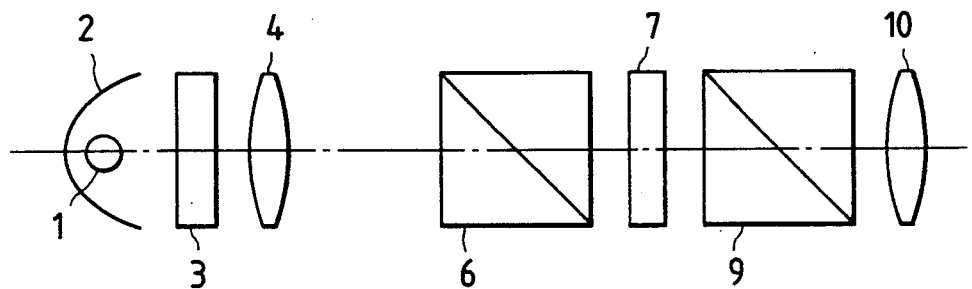
FIG. 2 is a schematic view showing the structure of another example of the conventional projection display apparatus.
Figure 3:
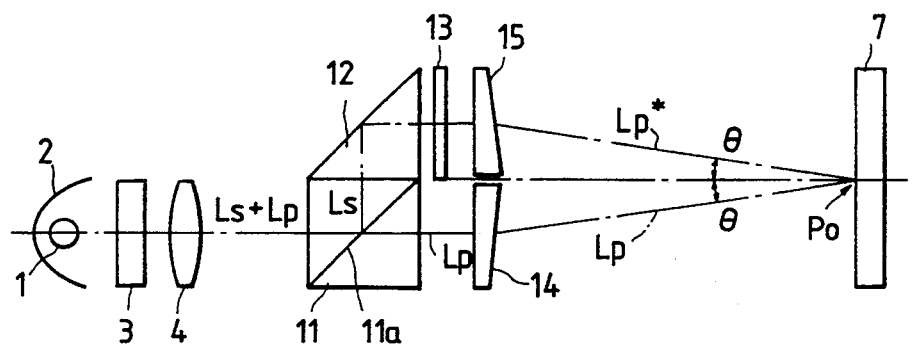
FIG. 3 is a schematic view showing the structure of a projection display apparatus disclosed in the Japanese Patent Application Laid-Open No. 61-90584.
Figure 4:
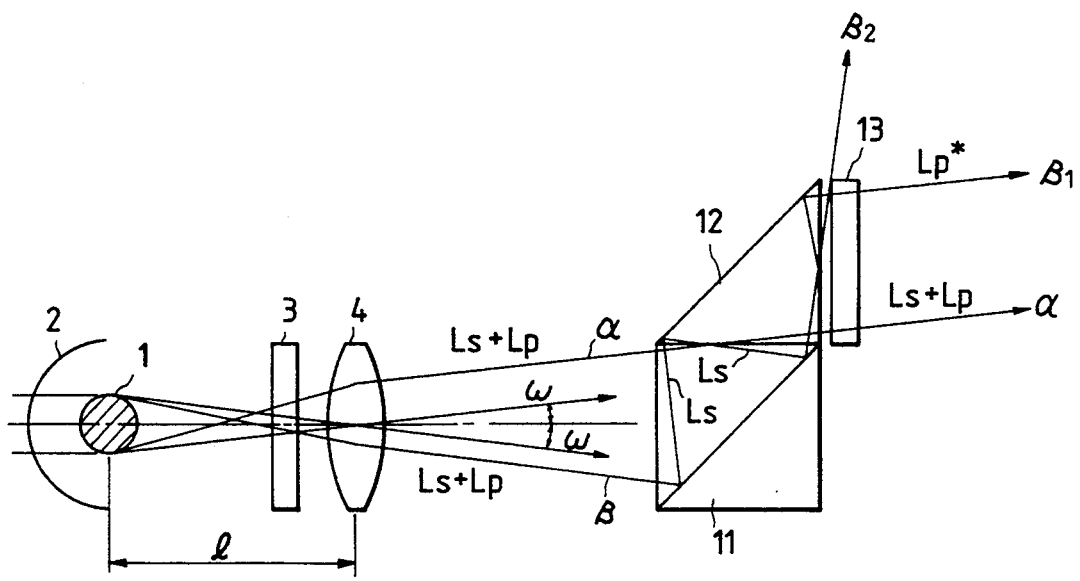
FIG. 4 is a schematic view showing a drawback encountered when the parallel illumination method is employed in the projection display apparatus shown in FIG. 3.

Also the projection display apparatus employing a transmission liquid crystal light valve as shown in FIG. 3 may be obtained by combining the polarized illuminating apparatus of the present invention shown in FIGS. 5, 7, 8 or 9 with the wedge-shaped lenses 14, 15 shown in FIG. 3. Also in the projection display apparatus shown in FIG. 1 or 2, the polarized illuminating apparatus of the present invention may be positioned between the condenser lens 4 and the polarizing plate 5, or between the condenser lens 4 and the polarizing beam splitter.

The polarized illuminating apparatus explained in the foregoing has the advantage of improving the efficiency of light utilization, by emitting either of the P- and S-polarized components, separated by a polarizing beam splitter, of the incident light beam and also the other component after rotation of the plane of polarization by 90° with a λ/4 phase shifting plate and a reflecting member. Consequently the present invention enables to obtain an image display apparatus capable of brighter display.

The polarizing beam splitter is usually so designed that the reflected S-polarized light and the transmitted P-polarized light are best separated at an incident angle of 45° to the functional plane. A high transmittance for the P-polarized component is obtained by selecting the refractive index of the multi-layered film constituting said functional plane so as to satisfy Brewster's law (Angle), but a decrease in transmittance is inevitable for any ray entering with an incident angle not matching the Brewster's low. Consequently, if a spreading light beam enters the functional plane, the reflected light contains the P-polarized component and the light beam emerging from the optical phase shifting plate contains the S-polarized component, so that the intensity of the light beam emerging from the polarizing beam splitter inevitably diminishes.

Also the optical phase shifting plate is unable to provide a phase difference of λ/2 or λ/4 in the entire wavelength range, because of its wavelength dependence (dispersion), so that the emerging light inevitably contains the S-polarized component.

Consequently, in the polarized illuminating apparatus utilizing such polarizing beam splitter and optical phase shifting plate, a pair of light beams of a same direction of polarization emerging from said apparatus may not be mutually equal in the intensity, giving rise to an uneven intensity distribution of the illuminating light. Besides said light beams may be mutually different in spectral distribution, so that the color of illuminating light may vary depending on the position of illumination.

In the following there will be explained a polarized illuminating apparatus capable of suppressing the unevenness in the intensity distribution or the spectral distribution of the illuminating light, and a projection display apparatus utilizing such polarized illuminating apparatus.

In a preferred embodiment of the present invention, an optical filter is employed for rectifying the unevenness in the intensity of said paired light beams. Said optical filter is inserted in either or both of the light paths of said P- and S-polarized components and serves to attenuate the intensity of the incident light.

Said optical filter can be of various types, such as a reflective filter for reflecting the incident light with simultaneous attenuation of intensity, a transmissive filter for transmitting the incident light with simultaneous attenuation of intensity, or a filter for absorbing the incident light.

Also said paired light beams can be given substantially equal spectral distributions, by suitably regulating the wavelength characteristics of said optical filter.

The optical filter to be employed in the present invention is for example composed of a multi-layered optical film or an ordinary color absorbing filter. In the former, desired characteristics can be obtained by regulating the material and thickness of said multi-layered optical film.

Also the aforementioned polarizing beam splitter can be suitably designed to rectify the unevenness in the intensity between said paired light beams. As the intensity ratio of said P- and S-polarized components can be varied by the adjustment on the optical thin film constituting the functional plane (light splitting plane) of said polarizing beam splitter, the unevenness in the intensity of said paired light beams, resulting from the dispersion of the phase shifting plate, may be rectified by such method.

Also the optical components, such as mirrors and prisms, for defining the optical paths of said P-and S-polarized components, may be given a function of the above-mentioned optical filter, in order to rectify the unevenness in the intensity of the paired light beams. In order to give the function of an optical filter to a mirror, said mirror is composed of a reflective filter with a multi-layered optical thin film. Also in order to give the function of an optical filter to a transparent component such as prism, a light absorbing material is mixed in the material for said component at the manufacture thereof.

In a preferred embodiment explained in the following, the polarized illuminating apparatus is provided with a polarizing beam splitter for splitting the incident light beam into a first P-polarized component and a first S-polarized component; a λ/4 phase shifting plate positioned in contact with an end of the functional plane of said polarizing beam splitter and adapted to receive said first P-polarized component and said first S-polarized component; and a reflective member for reflecting the first P-polarized component or the first S-polarized component transmitted by said λ/4 phase shifting plate toward said phase shifting plate, wherein the first P-polarized component or the first S-polarized component is converted respectively into a second S-polarized component or a second P-polarized component by said λ/4 phase shifting plate and said reflective member, and said first and second P-polarized components or said first and second S-polarized components are emitted from the apparatus, comprising at least a single optical filter positioned in contact with an end of the functional plane of said polarizing beam splitter and adapted to effect transmission, reflection or absorption on either one of two different polarized components, in the course from the separation of the first P-polarized component and the first S-polarized component by said polarizing beam splitter to the emission of the first and second P-polarized components or the first and second S-polarized components.

In another preferred embodiment to be explained later, the polarized illuminating apparatus is provided with a polarizing beam splitter with a functional plane for transmitting the P-polarized component of the incident light beam and perpendicularly reflecting the S-polarized component thereof; a reflective member positioned in contact at an end thereof perpendicularly to an end of the functional plane of said polarizing beam splitter and perpendicularly reflecting said transmitted P-polarized component; a λ/4 phase shifting plate positioned in contact at an end thereof, with an angle of 45°, with an end of the functional plane of said polarizing beam splitter and in contact with an end of the reflecting surface of said reflective member, and receiving said reflected S-polarized component; and a reflective plate with a reflective plane position close to said λ/4 phase shifting plate, wherein said reflected S-polarized component is converted into a P-polarized component by said λ/4 phase shifting plate and said reflective plate, and said converted P-polarized component and said transmitted P-polarized component are emitted from the apparatus, comprising at least an optical filter in contact with an end where the functional plane of said polarizing beam splitter and said λ/4 phase shifting plate are in mutual contact, wherein said optical filter includes at least one of a first optical filter which either serves also as said reflective member or is positioned in contact therewith or is positioned in the vicinity thereof, a second optical filter positioned at the entrance side of said λ/4 phase shifting plate, and a third optical filter which either serves as said reflective member positioned close to said λ/4 phase shifting plate or is positioned in contact with said reflective member or is positioned in the vicinity thereof, and transmits, reflects or absorbs a part of the incident light beam.

In these two preferred embodiments, either one of the P- and S-polarized components split by the polarizing beam splitter is introduced into the λ/4 phase shifting plate and the reflective member to rotate the plane of polarization by 90° to coincide with that of the other component, whereby the incident light beam can be fully utilized by the emission of both polarized components.

As the functional plane of the polarizing beam splitter and the λ/4 phase shifting plate are positioned in mutual contact at an end, no ray can enter the λ/4 phase shifting plate without passing the functional plane of the polarizing beam splitter or can re-enter said functional plane without passing the λ/4 phase shifting plate.

The S-polarized component reflected by the functional plane of the polarizing beam splitter contains a considerable amount of P-polarized component resulting from non-perpendicularly incident rays, and the converted P-polarized component obtained by the λ/4 phase shifting plate and the reflective member also contains a considerable amount of S-polarized component because said λ/4 phase shifting plate cannot provide a phase difference of λ/4 over the entire wavelength range, but the reflectance for the S-polarized component of the polarizing beam splitter can be made close to 100% for both perpendicularly and non-perpendicularly incident rays.

Also the two emitted P-polarized components may mutually differ in intensity or in color, based on the characteristics of the polarizing beam splitter, particularly the incident angle dependence of the transmittance of the P-polarized component, the spectral dispersion of the λ/4 phase shifting plate, the reflection loss of the reflective plane contacting said phase shifting plate, the reflection loss of the reflective plane for perpendicularly reflecting the P-polarized component transmitted by said polarizing beam splitter etc. However the optical filter positioned in contact with an end of the functional plane of the polarizing beam splitter enables correction on intensity and/or color independently on the two emitted P-polarized components without generating light leakage, so that no overall unevenness nor local variation in the central area in the illumination intensity or color is encountered even in the parallel illumination system.

Figure 12:
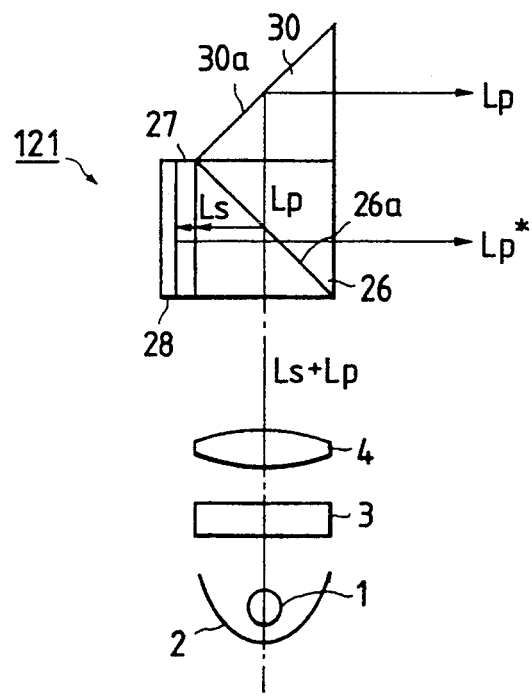
FIG. 12 is a view of the basic structure of a fifth embodiment of the polarized illuminating apparatus of the present invention.
Figure 13:
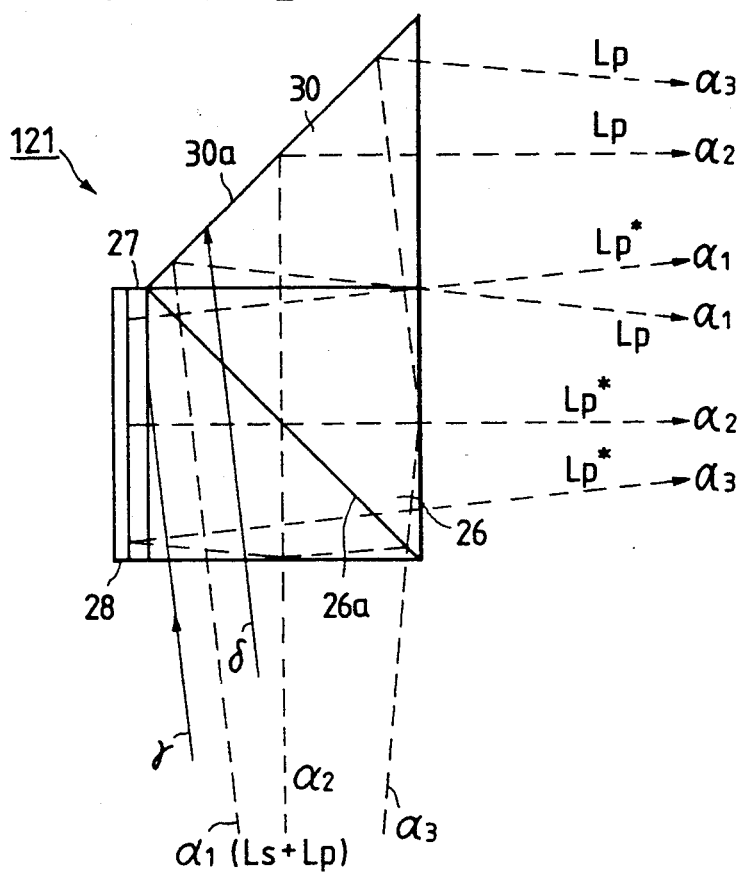
FIG. 13 is a schematic view of the optical path of the polarized illuminating apparatus shown in FIG. 12.

FIG. 12 is a view of a fifth embodiment of the polarized illuminating apparatus of the present invention, and FIG. 13 is a schematic view showing the optical path thereof.

Said polarized illuminating apparatus 121 is provided with a polarizing beam splitter 26 having a functional plane (an evaporated film formed on a diagonal plane where two rectangular prisms are adhered) for transmitting the P-polarized component $L_p$ of a parallel beam emerging from a condenser lens 4 while perpendicularly reflecting the S-polarized component $L_s$ thereof; a prism 30 positioned in contact at an end thereof perpendicularly with an end of the functional plane (light splitting plane) 26 of the polarizing beam splitter, and having a reflective plane 30a which is provided with an optical filter and reflects perpendicularly said transmitted P-polarized component $L_p$; a λ/4 phase shifting plate 27 positioned in contact at an end thereof, with an angle of 45°, with an end of the functional plane 26a of the polarizing beam splitter 26 and in contact with an end of the reflective plane 30a of the prism 30 and receiving said reflected S-polarized component $L_s$; and a reflective plate 28 having a reflective plane adhered to said λ/4 phase shifting plate 27.

The polarizing beam splitter 26 is so selected as to be capable of splitting the polarized components over the entire visible wavelength range, particularly with a high reflectance for the S-polarized component, and the λ/4 phase shifting plate 27 is composed of an optical crystal capable of providing a phase difference of λ/4 at the approximate center of the wavelength range to be used.

The reflective plate 28 is provided with a reflective plane composed of an aluminum evaporated film. The reflective plane 30a is provided, as will be explained later, in succession from the side of beam splitter 26, with an aluminum evaporated film and an absorbing filter showing a weak absorption on a part, particularly red and blue regions, of the incident light.

In the present polarized illuminating apparatus 121, the parallel beam emerging from the condenser lens 4 is split into the P-polarized component $L_p$ and the S-polarized component $L_s$ by transmission and perpendicular reflection, respectively, by the functional plane 26a of the polarizing beam splitter 26. Said reflected S-polarized component enters the λ/4 phase shifting plate 27, then reflected by the reflective plane of the reflective plate 28 and again transmitted by said phase shifting plate 27, thereby being subjected to a rotation of the plane of polarization by 90° and thus converted into a P-polarized component $L_p^*$, which is transmitted by the functional plane 26a and emerges from the polarizing beam splitter. On the other hand, said transmitted P-polarized component $L_p$ is perpendicularly reflected by the reflective plane 30a of the prism 30 and emerges therefrom, parallel to said converted P-polarized component $L_p^*$ but along a different light path.

Also in the present polarized illuminating apparatus 121, all the light beam entering the polarizing beam splitter 26 is received by the functional plane 26a thereof, as indicated by rays $\alpha_1$, $\alpha_2$, and $\alpha_3$ in FIG. 13, and split into the P-polarized component $L_p$ and the S-polarized component $L_s$. Also said S-polarized component $L_s$ is all received by the λ/4 phase shifting plate 27 and is subjected to the rotation of plane of polarization. Inversely said P-polarized component never enters said phase shifting plate 27. Also with respect to any arbitrary ray, said P-polarized component $L_p$ emitted from the prism 30 and said converted P-polarized component $L_p^*$ emitted from the polarizing beam splitter 26 are mutually symmetrical in the vertical direction. Consequently an abrupt change in the illumination intensity can be prevented at the connection of the P-polarized component $L_p$ and the converted P-polarized component $L_p^*$ even if the incident light beam to the polarizing beam splitter becomes unbalanced for example by a positional deviation of the light source 1.

Rays emerging from the condenser lens 4 and unparallel to the optical axis, such as $\alpha_1$ and $\alpha_3$ shown in FIG. 13, enter the polarizing beam splitter 26 non-perpendicularly, so that the incident angle to the functional plane 26a is also deviated from 45°. Consequently the S-polarized component reflected by said functional plane 26a of the polarizing beam splitter 26 contains the P-polarized component of such non-parallel rays. Also the light converted by the λ/4 phase shifting plate 27 and the reflective plate 28 contains the S-polarized component because the phase difference provided by said phase shifting plate 27 is associated with a dispersion depending on the wavelength. However, as the reflectance of said polarizing beam splitter 26 for the S-polarized component can be made high for both the parallel and non-parallel incident rays, the structure of the present embodiment can provide a sufficiently high depolarization ratio in the emitted P-polarized light $L_p^*$.

In the course of reflection of the S-polarized component $L_s$ by the polarizing beam splitter 26 and conversion thereof in the λ/4 phase shifting plate 27 and the reflective plate 28 into the P-polarized components $L_p^*$ as shown in FIG. 12, the intensity of said P-polarized component $L_p^*$ is reduced to T.R times of that of said S-polarized components $L_s$, wherein T is the rotation of plane of polarization in two passings (going and returning) through the phase shifting plate 27 while R is the reflectance of the reflective plate 28, so that the emitted P-polarized components $L_p$, $L_p^*$ become mutually different in intensity and in color. The reflective plane 30a may be given an attenuating effect for preventing such differences. Examples of the structure of such reflective plane are shown in FIGS. 14 to 18, wherein same components as those in FIG. 12 are represented by same numbers.

Figure 14:
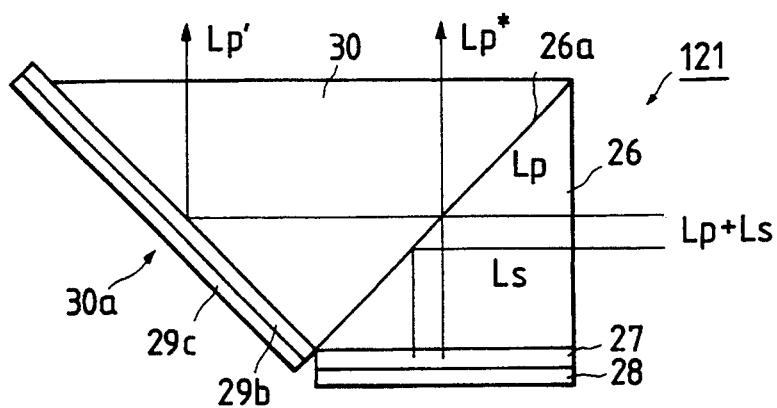
FIGS. 14 to 17 are views showing the details of sixth to ninth embodiments of the polarized illuminating apparatus of the present invention.

In FIG. 14, there are shown a reflective plane 29c composed of an aluminum evaporated film formed on the surface of the prism 30, and a light absorbing filter 29b. The P-polarized component $L_p$ transmitted by the polarizing beam splitter 26 is partially absorbed by the filter 29b, then perpendicularly reflected by the reflective plane 29c, again partially absorbed by the filter 29c and emitted as the P-polarized component $L_p'$ of predetermined intensity and spectral distribution. The absorbance of the absorbing filter 29b for different wavelength components have to be so adjusted that both P-polarized components $L_p'$ and $L_p^*$ become mutually equal in intensity and in color (spectral distribution).

Figure 15:
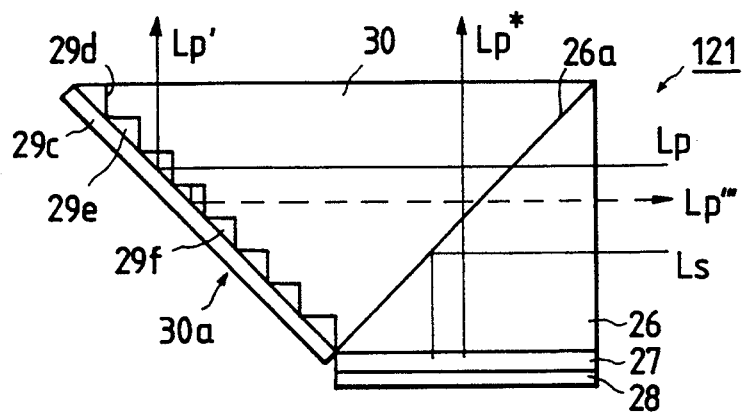

In FIG. 15, half-reflecting planes (half mirrors) 29d, 29e composed for example of multi-layered optical films are formed stepwise on the diagonal faces of the prism 30. The P-polarized component $L_p$ transmitted by the polarizing beam splitter 26 is partially reflected by the half-reflecting planes 29d, but the remaining portion is transmitted. Said portion is perpendicularly reflected by a reflective plane 29c composed of an aluminum evaporated film and reaches the half-reflecting planes 29e. The portion reflected by the half-reflecting planes 29d is transmitted by the polarizing beam splitter 26 as a P-polarized component $L_p'''$. On the other hand, the P-polarized component reaching the half-reflecting planes 29e is partially reflected, and the reflected portion returns to the half-reflecting planes 29d by way of the reflective plane 29c, while the remaining portion is transmitted by said half-reflecting planes 29c and is emitted as a P-polarized component $L_p'$. The light reflected by the half-reflecting planes 29e and returning to the half-reflecting planes 29d is partially transmitted as the P-polarized component $L_p'''$, and the remaining portion is again reflected and propagates towards the reflective plane 29c. The above-explained procedure is repeated whereby the P-polarized component is divided into $L_p'$ and $L_p'''$. Thus the reflectance and transmitance of the half-reflecting planes 29d, 29e are to be so selected that the P-polarized components $L_p'$ and $L_p^*$ become mutually equal in intensity and color. Also in case only either of the half-reflecting planes 29d and 29e is employed, similar advantages can be expected by suitably selecting the reflectance and transmitance thereof. An area 29f, surrounded by the reflecting planes 29c, 29d and 29e, may also be filled (constituted) with glass of a predetermined reflective index, whereby it is rendered possible to utilize the total reflection at the interface with air and thus to dispense with the reflective plane 29c composed of aluminum evaporated film.

Figure 16:
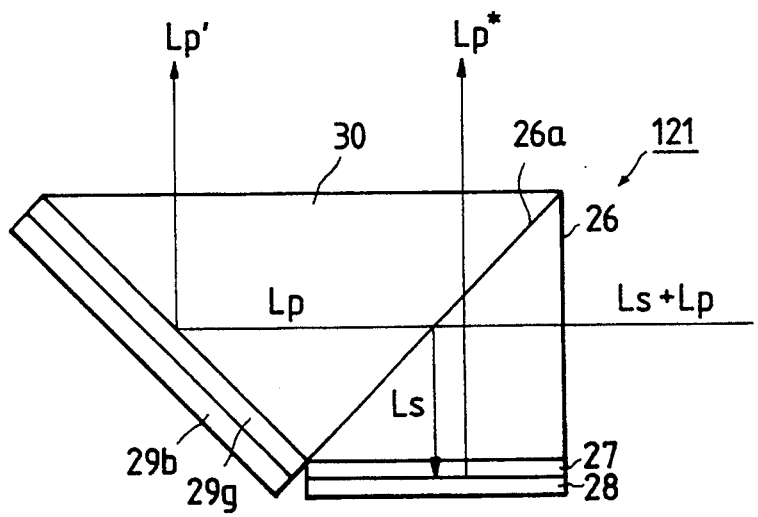

In FIG. 16, there are provided a multi-layered film 29g, and an absorbing film 29b for absorbing the light transmitted by the film 29g. The mutual optically adhesion of both films allows to regulate the structure of the film 29g thereby controlling the reflectance thereof to the P-polarized component $L_p$ in such a manner that the P-polarized component $L_p'$ becomes equal to the P-polarized component $L_p^*$.

Figure 17:
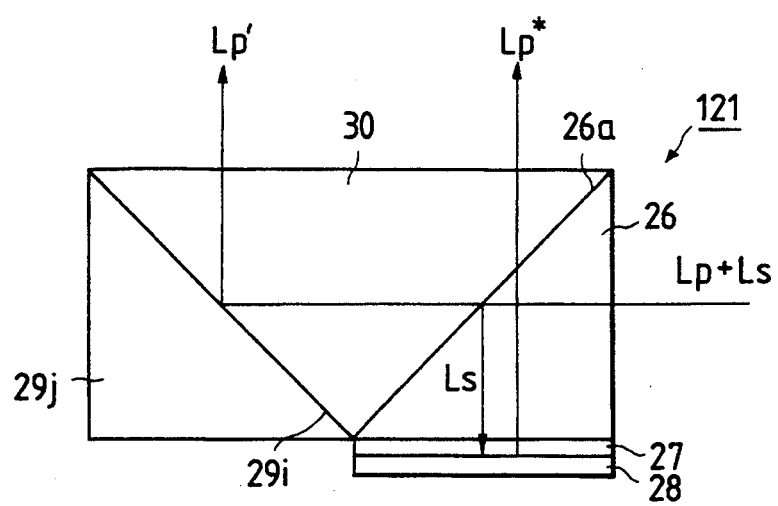

In FIG. 17, there are provided an optical filter 29i which is an optical multi-layered film 29i formed on a reflective plane of the prism 30, and a prism 29j optically adhered to the film 29i. Said film 29i is so designed that the P-polarized components $L_p'$ and $L_p^*$ become mutually substantially equal in intensity and in color.

In the polarized illuminating apparatus 121 of the structures shown in FIGS. 12 to 17, the incident light to the polarizing beam splitter 26, if obliquely entering the λ/4 phase shifting plate 27 as exemplified by a ray γ in FIG. 13, may result in a loss in the intensity by transmission or absorption by said phase shifting plate 27. However such light loss can be prevented by forming, on the junction plane of the polarizing beam splitter 26 and the λ/4 phase shifting plate 27, an optical multi-layered film which reflects a ray of a large incident angle, such as the ray γ, but transmits the normal ray of a smaller incident angle.

As explained in the foregoing, the present polarized illuminating apparatus 121 can improve the efficiency of light utilization, since both the P-polarized component $L_p$ and the S-polarized component $L_s$, split by the polarizing beam splitter, can be utilized for illuminating the liquid crystal light valve (not shown). It can also drastically reduce the imbalance of illumination intensity distribution which has been a problem in the parallel illumination system with said P-polarized component $L_p$ and said converted P-polarized component $L_p^*$, and can achieve a reduction in the distance between the polarized illuminating apparatus and the liquid valve, a target difficult to achieve in the conventional illuminating system with synthesized light as shown in FIG. 3, thereby enabling to compactize the projection display apparatus employing the polarized illuminating apparatus 121 of the present invention.

The prism 30 may be formed integrally with a rectangular prism, positioned adjacent to said prism 30, of the polarizing beam splitter.

In the above-explained embodiments, the optical filters are formed integrally on the prism 30, but such optical filter may naturally be formed separately. Also such optical filters may be provided in the optical path of the P-polarized component $L_p$ after emerging from the prism 30 and/or in the optical path of the P-polarized component $L_p^*$ after emerging from the beam splitter 26.

In the present invention there may also be employed, in addition to the filters capable of resulting both the light amount (intensity) and the color (spectral distribution) such as those shown in the foregoing embodiments, a filter for regulating the intensity only such as a neutral density (ND) filter. It is also possible to regulate the intensity with an ND filter and the color with a color filter, by positioning said filters in at least one of the optical paths for the P-polarized components $L_p$, $L_p^*$. Furthermore a color absorbing material may be mixed in the prism 30 or prisms constituting the beam splitter 26 to provide these components with a filter function.

Figure 18:
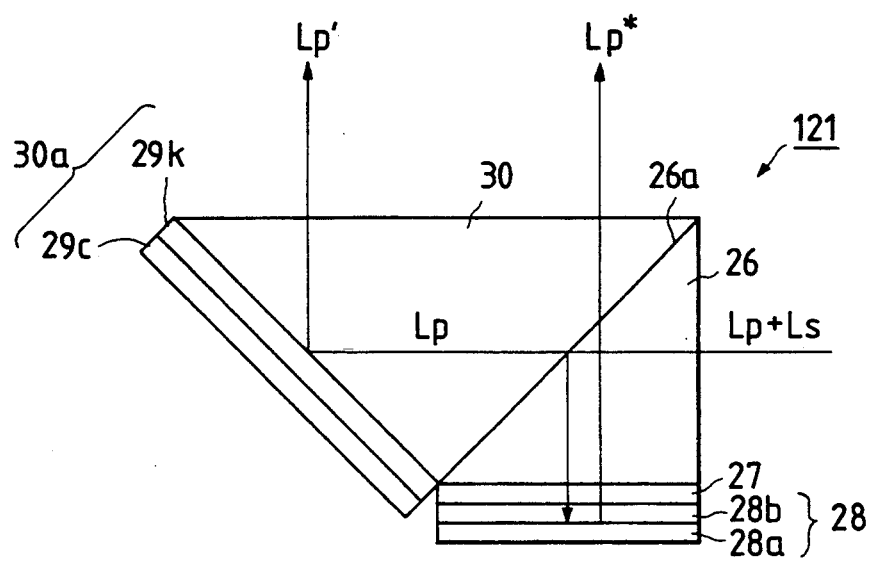
FIGS. 18 and 19A to 19C are respectively a view and charts showing a tenth embodiment of the polarized illuminating apparatus of the present invention.

FIG. 18 shows still another embodiment of the present invention, wherein the structure other than the reflective plane 28 and 30a is same as that shown in the foregoing embodiments in FIGS. 12 to 17 and will not, therefore, be explained.

The λ/4 phase shifting plate 27 is so designed as to provide a phase difference of λ/4 in the green wavelength range. Thus said phase shifting plate 27 has a function, in the green wavelength range, of rotating the plane of polarization by approximately 90° in two passages of the light, but in the red and blue wavelength ranges of which the central wavelengths are different by about 100 nm from that of said green wavelength range, the percentage of conversion from an incident polarized component to the orthogonally polarized component diminishes to about 90%. Consequently, of the reflective planes 28 and 30a have a same reflectance, the P-polarized component $L_p^*$ reflected by the reflective plane 28 becomes weaker in intensity, by about 10% in the red and blue wavelength ranges, than the P-polarized component $L_p'$ reflected by the reflective plane 30a.

In the present embodiment, it is rendered possible, as will be explained in the following, to eliminate such imbalance in intensity and in color between the polarized components $L_p^*$ and $L_p'$.

The reflective plane 28 is composed, in succession from the side of the beam splitter 26, of a multi-layered film 28b and an aluminum evaporated film 28a. Also the reflective plane 30a is composed, from the side of the prism 30, of a multi-layered film 29k and an aluminum evaporated film 29c.

The reflectance of aluminum in the visible wavelength range is about 90% at highest. On the other hand, the reflectance of the multi-layered films 28b, 29k can be considerably arbitrarily selected with a range from 0 to 100%, depending on the layer structure. On the other hand, a stable reflectance can be easily obtained with aluminum, independently from the thickness thereof, but, the multi-layered film requires a precisely controlled film forming process for obtaining stable reflective characteristics, as the reflectance depends greatly on the film thickness.

In the present embodiment, each of the reflective planes 28, 30 is composed of a combination of a metal film, particularly an aluminum film, which can easily provide a stable reflectance despite of a certain reflection loss, and a multi-layered film which provides a larger freedom in the selection of reflectance, thereby enabling stable and delicate control of the difference of about 10% in intensity and in color, between the P-polarized components $L_p'$ and $L_p^*$ resulting from the dispersion characteristics specific to the λ/4 phase shifting plate, as will be explained more detailedly in the following.

Figure 19A:
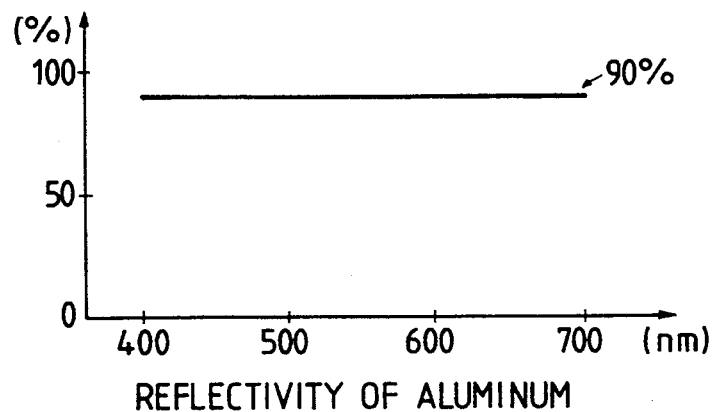
Figure 19B:
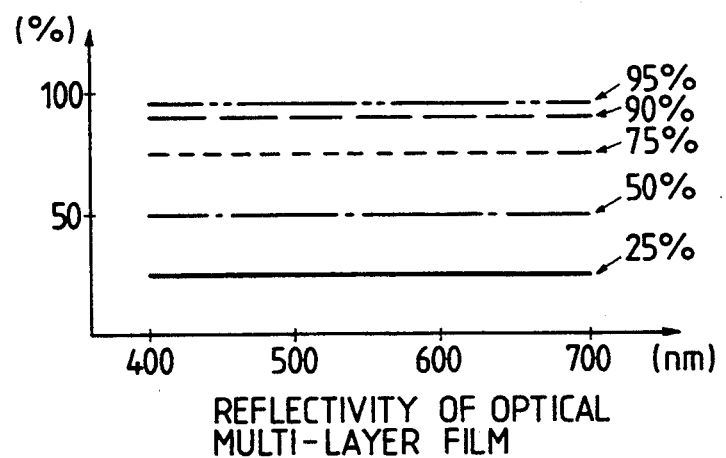
Figure 19C:
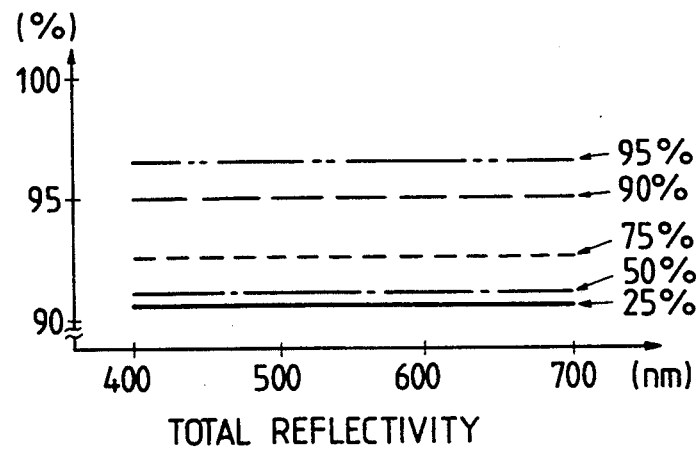

FIGS. 19A, 19B and 19C respectively show the reflectance of an aluminum film, the reflectance of a multi-layered film, and the overall reflectance including the multiple reflections between both films, in the absence of mutual interference among the lights reflected by said films. A portion not reflected by the aluminum film is lost. The total reflectance $R_{tot}$ is determined as follows:

$$R_{tot.} = \frac{R + r - 2HR}{1 - rR}$$

$$(= r + (1 - r)R(1 - r) + (1 - r)RHR(1 - r) + \ldots)$$

wherein
 r: reflectance of optical multi-layered film
 R: reflectance of aluminum.

As shown in FIG. 19C, the variation in the total reflectance $R_{tot}$ is several times to several tens of times smaller than that in the reflectance of the multi-layered film, so that the total reflectance $R_{tot}$ is affected little by a certain fluctuation in the reflectance of the multi-layered film.

Consequently it is relatively easy to control the total reflectance with a precision of 1% or less also by the control of the reflectance of the multi-layered films 28b, 29k.

In case the aluminum film and the multi-layered film are in mutual contact or are separated only by a distance of the order of wavelength, the multi-layered film has to be designed in consideration of the interference of the reflected lights from both films. However there is still applied the same basic principle of controlling the reflectance, in excess of the reflectance of aluminum of 90%, with the multi-layered film, so that the control of reflectance is easier in comparison with the control by the multi-layered film alone.

In the following there will be explained two combinations of the reflective planes 28, 30b shown in FIG. 18.

In the first combination, in the reflective plane 28, the multi-layered film 28b is so designed as to provide the aluminum film 28a with a reflection enhancing function with little wavelength dependence in the visible range, thereby minimizing the reflection loss of the reflective plane 28. On the other hand, in the reflective plane 30a, the multi-layered film 29k enhances the reflection of the aluminum film 29c strongly in the green wavelength region and weakly in the red and blue wavelength regions, thereby suppressing the imbalances in intensity and in color of the P-polarized components $L_p'$ and $L_p^*$ resulting from the influence of the phase shifting plate 27. This structure provides the highest efficiency of light utilization.

In the second combination, in the reflective plane 28, the optical multi-layered film 28b provides the aluminum film 28a with reflection enhancement, weakly in the green wavelength region and strongly in the red and blue wavelength regions, thereby cancelling the characteristics of the λ/4 phase shifting plate 27 and obtaining a P-polarized component $L_p^*$ balanced in the intensity of red, green and blue colors. On the other hand, in the reflective plane 30a, the multi-layered film 29k provides the aluminum 29c with a reflection enhancement with little wavelength dependence in the visible range, in such a manner that the P-polarized components $L_p'$ and $L_p^*$ become balanced in intensity and in color.

Figure 20:
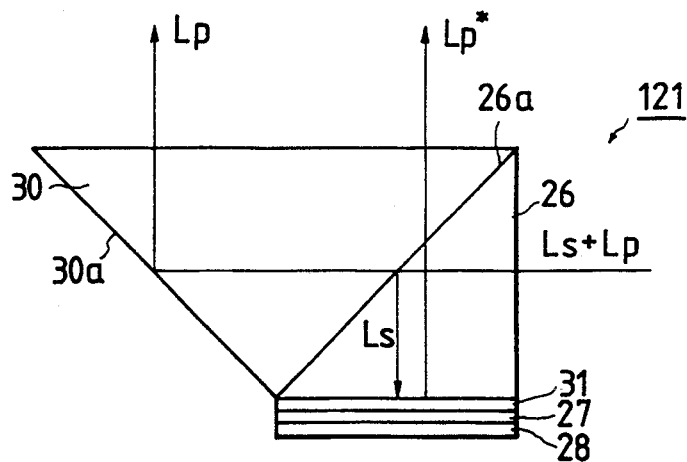
FIGS. 20, 21, 22, 23A and 23B are views showing still other embodiments of the present invention.

FIG. 20 shows still another embodiment of the present invention, wherein shown are an absorptive or reflective color filter 31, and a total reflection plane 30a of the prism 30. The incident light enters a prism 26 from the right-hand side, and is separated by the functional plane 26a into the P-polarized (transmitted) component $L_p$ and the S-polarized (reflected) component $L_S$. The P-polarized component is reflected by the reflective plane 30a, constituting an interface with air, of the prism 30 and emerges upwards. The S-polarized component is transmitted by the color filter 31, then converted into a P-polarized component by the rotation of plane of polarization by 90° in the λ/4 phase shifting plate 27 and the reflective plate 28, again transmitted by the color filter 31 in the opposite direction, further transmitted by the functional plane 26a and emitted upwards. Said color filter 31 has such spectral characteristics as to correct the spectral distribution of the polarized component returning to the functional plane 26a after being converted in the λ/4 phase shifting plate 27 and the reflective plate 28 to the spectral distribution of the P-polarized component $L_p$. Consequently the P-polarized components $L_p$, $L_p^*$ have a same spectral distribution or a same color.

Figure 21:
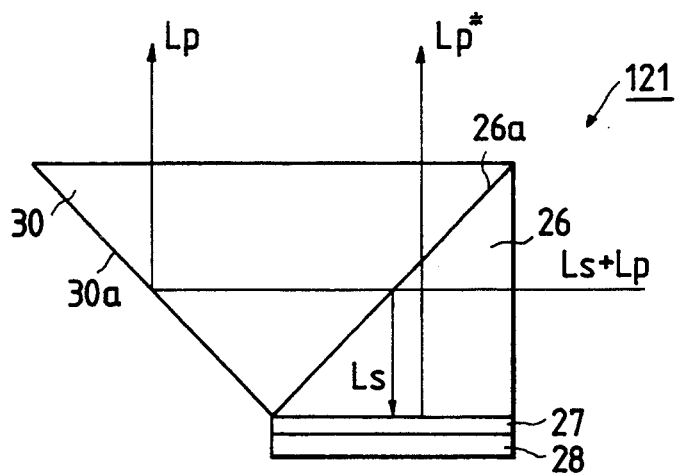

FIG. 21 shows still another embodiment of the present invention, in which a multi-layered reflective color filter 28 is provided in contact with the λ/4 phase shifting plate 27.

This embodiment effects correction of color (spectral distribution) when the S-polarized component coming from the plane 26a and through the phase shifting plate 27 is reflected by the reflective color filter 28. The spectral characteristics of said reflective color filter 28 is so selected that the spectral distributions of the P-polarized components $L_p$ and $L_p^*$ become mutually equal, so that both components have a same color.

Figure 22:
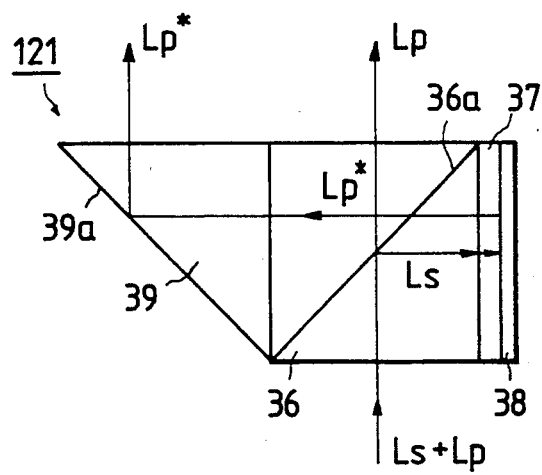

FIG. 22 shows still another embodiment of the present invention.

The polarized illuminating apparatus 121 of the present embodiment is different from that shown in FIG. 12 in that the P-polarized component $L_p$ transmitted by the functional plane 36a of the polarizing beam splitter 36 is immediately emitted therefrom, while the S-polarized component $L_s$ reflected by said functional plane 36a is converted into the P-polarized component $L_p^*$ by the λ/4 phase shifting plate 37 and the reflective plate 38, then perpendicularly reflected by the total reflection plane 39a of the total reflection prism 39 and is emitted therefrom, parallel to the aforementioned P-polarized component $L_p$. Said P-polarized components $L_p$, $L_p^*$ are adjusted to a same color by adding an absorptive or reflective optical filter explained above to the reflective plate 38 or the reflective plane 39a.

The above-explained polarized illuminating apparatus 121 can match the direction of emitted beams with that of incident beam without the additional of other optical components. The apparatus of the present embodiment may be incompatible with the uncollimated light because the P-polarized component $L_p$ and said converted P-polarized component $L_p^*$ have different optical path lengths, but provide other advantages same as those in the apparatus shown in FIG. 12.

The total reflection prism 39 may be formed integrally with a rectangular prism, positioned adjacent to said total reflection prism, of the polarizing beam splitter 36.

In the embodiments shown in FIGS. 20 to 22, the unbalance in the intensities of the P-polarized components $L_p$, $L_p^*$ can be corrected by positioning an absorptive filter, such as an ND filter, in at least one of the optical paths of said components.

Also instead of the use of such optical filter, the characteristics of the polarizing beam splitter may be suitably controlled to correct the intensity unevenness resulting from the dispersion by the phase shifting plate.

In the following there will be explained an embodiment of the projection display apparatus, employing the polarized illuminating apparatus of the present invention in combination with other optical components.

Figure 23A:
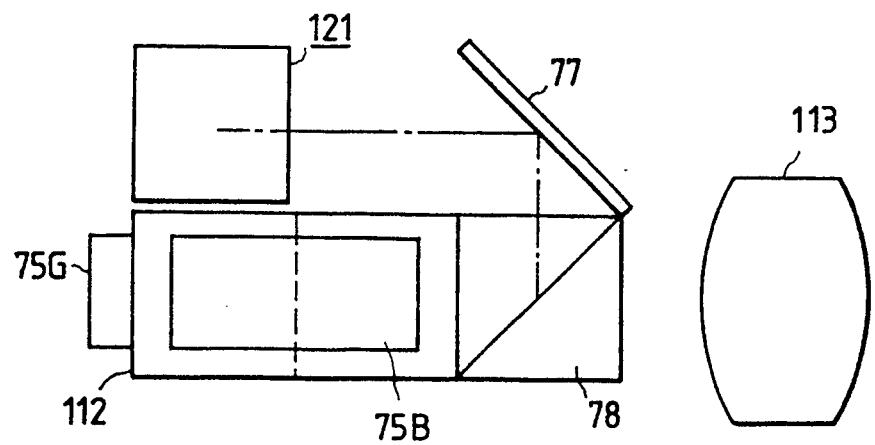
Figure 23B:
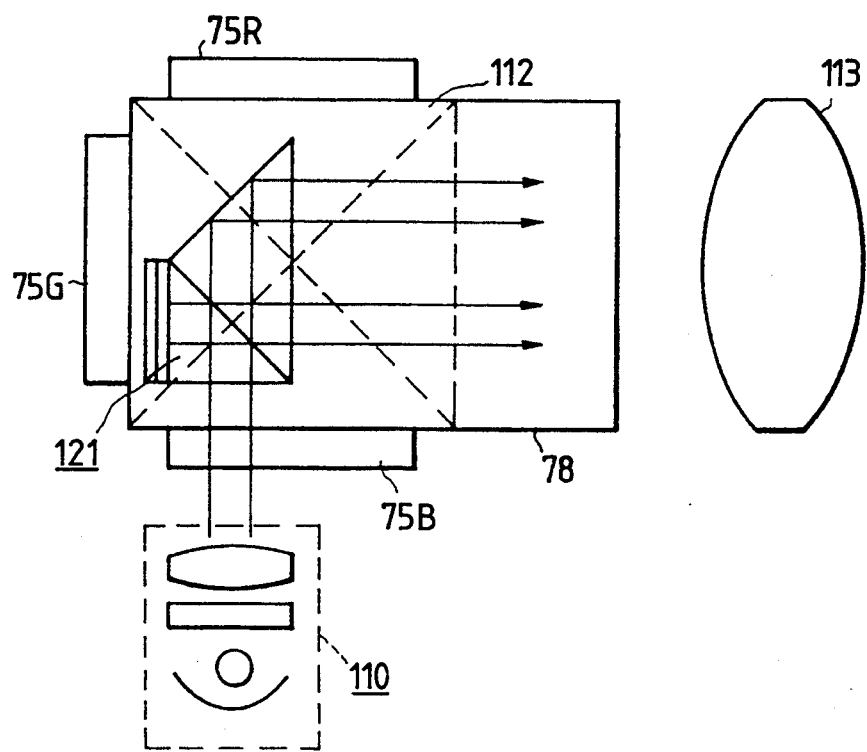

FIGS. 23A and 23B are respectively a side view and a plan view, showing the principal part of said embodiment.

Said projection display apparatus is provided with a light source unit 110; a polarized illuminating apparatus 121 shown in one of FIGS. 12 to 21; a mirror 77 for reflecting the light beam from said apparatus 121 perpendicularly downwards; a polarizing beam splitter 78 for perpendicularly reflecting the S-polarized component of the light beam reflected by said mirror 77 toward the polarized illuminating apparatus 121 while transmitting the P-polarized component of said light beam; a cross dichroic prism 112 adhered at a lateral face thereof to the emitting plane for said S-polarized component of said polarizing beam splitter 78 and bearing reflective liquid crystal light valves 75R, 75G, 75B for red, green and blue colors on other three lateral faces; and a projection lens 113 positioned at a side of said polarizing beam splitter 78 opposite to the cross dichroic prism 112.

A parallel white light beam from the light source unit 100 enters the polarized illuminating apparatus 121 which emits to the mirror 77, as shown in FIGS. 12 to 21, the P-polarized component of said 10 white light beam and the P-polarized component converted by the λ/4 phase shifting plate 27 and the reflective plate 28 of a same intensity (said P-polarized component and said converted P-polarized component being hereinafter collectively called P-polarized beams). Said P-polarized beams are totally reflected by the mirror 77 and enter the polarizing beam splitter 78. As said P-polarized beams have an S-polarized plane with respect to the functional plane of the polarizing beam splitter 78, they are reflected by said functional plane and enter the cross dichroic prism 112. Said P-polarized beams are modulated by the reflective liquid crystal light valves 75R, 75G, 75B, and the resulting beams enter the polarizing beam splitter 78, which functions as an analyzer, whereby the reflected components transmitted by said beam splitter 78 are projected onto a screen (not shown) through the projection lens 113, thereby forming an image on said screen.

In the foregoing embodiments, the correction has been directed to the unevenness in the intensity in a pair of illuminating light beams, resulting from the dispersion in a phase shifting plate, but additional correction may be incorporated in order to correct the unevenness resulting from the dispersion in the polarizing beam splitter. Also the phase shifting plate may be composed of an optical crystal, a film or a liquid crystal.

What is claimed is:

1. An image display apparatus comprising:
   a radiation source;
   a generator for generating an image by modulating a polarized beam; and
   directing means for directing a beam from said radiation source to said generator;
   wherein said directing means comprises a conversion optical system for converting the beam from said radiation source into said polarized beam,
   wherein said conversion optical system includes a polarizing beam splitter for splitting the beam from said radiation source into a first beam and a second beam of mutually orthogonal polarization directions and an arrangement of a ¼ wavelength plate and a mirror for changing the direction of polarization of said first beam to generate a third beam of a polarization direction the same as that of said second beam and for directing said third beam to said polarizing beam splitter, wherein said first beam is formed by reflecting one portion of the beam from said radiation source with a beam splitting surface of said polarizing beam splitter and said second beam is formed by transmitting an another portion of the beam from said radiation source through the beam splitting surface of said polarizing beam splitter, and wherein said conversion optical system generates said third beam without redirecting said first beam to said radiation source and directs said second and third beams to said generator.

2. An apparatus according to claim 1, wherein said directing means has a collimator for converting the beam from said radiation source into a substantially parallel beam, which is introduced into said conversion optical system.

3. An apparatus according to claim 1 or 2, wherein said polarizing beam splitter is adapted to generate said first beam by reflecting the S-polarized component of the beam from said radiation source and to generate said second beam by transmitting the P-polarized component of said beam.

4. An apparatus according to claim 3, wherein said conversion optical system is so constructed as to direct said second beam in a predetermined direction and has an auxiliary mirror for reflecting said third beam to said predetermined direction.

5. An apparatus according to claim 3, wherein said conversion optical system is so constructed as to direct said third beam to a predetermined direction and has an auxiliary mirror for reflecting said second beam to said predetermined direction.

6. An apparatus according to claim 2, wherein said conversion optical system has an optical filter for compensating an unevenness in intensity between said second and third beams.

7. An apparatus according to claim 6, wherein said conversion optical system is so constructed as to direct said second beam to a predetermined direction and has an auxiliary mirror for reflecting said third beam to said predetermined direction, and said mirror is provided with said optical filter.

8. An apparatus according to claim 6, wherein said conversion optical system is so constructed as to direct said third beam to a predetermined direction and has an auxiliary mirror for reflecting said second beam to said predetermined direction, and said mirror is provided with said optical filter.

9. An apparatus according to claim 6, wherein said mirror is provided with said optical filter.

10. An apparatus according to claim 6, wherein said optical filter is provided between said polarizing beam splitter and said arrangement.

11. An apparatus according to any of claims 6 to 10, wherein said optical filter has a multi-layered structure.

12. An apparatus according to claim 2, wherein said conversion optical system has a color filter for compensating an unevenness in color between said second and third beams.

13. An apparatus according to any of claims 1 to 12, further comprising a projection optical system for projecting said image onto a predetermined plane.

14. An image display apparatus comprising:
a radiation source;
a generator for generating an image by modulating a polarized beam; and
directing means for directing a beam from said radiation source to said generator;

wherein said directing means comprises a collimator for substantially collimating the beam from said radiation source and a conversion optical system for converting the collimated beam into said polarized beam, and wherein said conversion optical system includes a polarizing beam splitter provided with a splitting surface, inclined to the optical axis of said collimator, for splitting said collimated beam by transmitting the P-polarized beam thereof and reflecting the S-polarized beam thereof; and arrangement of a ¼ wavelength plate and a mirror for changing the polarization direction of said S-polarized beam to cause the polarization direction thereof to be coincident with the polarization direction of said P-polarized beam and directing said S-polarized beam to a predetermined direction through said polarizing beam splitter without redirecting said S-polarized beam to said radiation source; and an auxiliary mirror for reflectively deflecting said P-polarized beam to said predetermined direction.

15. An apparatus according to claim 14, wherein said conversion optical system has an optical filter for compensating an unevenness in intensity between said P-polarized beam and said S-polarized beam.

16. An apparatus according to claim 15, wherein the mirror of said arrangement is provided with said optical filter.

17. An apparatus according to claim 15, wherein said auxiliary mirror is provided with said optical filter.

18. An apparatus according to claim 15, wherein said optical filter is provided between said polarizing beam splitter and said arrangement.

19. An apparatus according to claim 14, wherein said conversion optical system has a color filter for compensating the unevenness in color between said P-polarized beam and said S-polarized beam.

20. An apparatus according to any of claims 14 to 19, further comprising a projection optical system for projecting said image onto a predetermined plane.

21. An image display apparatus comprising:
a radiation source;
a generator for generating an image by modulating a polarized beam; and
directing means for directing a beam from said radiation source to said generator;

wherein said directing means comprises a collimator for substantially collimating the beam from said radiation source and a conversion optical system for converting the thus collimated beam into said polarized beam, and wherein said conversion optical system includes a polarizing beam splitter provided with a splitting surface, inclined to the optical axis of said collimator, for splitting said collimated beam by transmitting the P-polarized beam thereof and reflecting the S-polarized beam thereof into a predetermined direction; a second polarizing beam splitter provided with a splitting surface inclined to the optical axis of said collimator; and an arrangement of a ¼ wavelength plate and a mirror for receiving said P-polarized beam through said second beam splitter, changing the polarization direction of said P-polarized beam to cause the polarization direction thereof to be coincident with the polarization direction of said S-polarized beam so as to form a second S-polarized beam, and causing said second polarizing beam splitter to reflect said second S-polarized beam toward said predetermined direction without redirecting said P-polarized beam to said radiation source.

22. An image display apparatus comprising:
a radiation source;
a generator for generating an image by modulating a polarized beam; and
directing means for directing the beam from said radiation source to said generator;
wherein said directing means comprises a collimator for substantially collimating the beam from said radiation source and a conversion optical system for converting the thus collimated beam into said polarized beam; and
wherein said conversion optical system includes a polarizing beam splitter provided with a splitting surface, inclined to the optical axis of said collimator, for splitting said collimated beam by transmitting the P-polarized beam thereof to a predetermined direction and reflecting the S-polarized beam thereof, an arrangement of a ¼ wavelength plate and a mirror for changing the polarization direction of said S-polarized beam to cause the polarization direction of said S-polarized beam to be coincident with the polarization direction of said P-polarized beam so as to form a second P-polarized beam and directing said second P-polarized beam to said polarizing beam splitter, without redirecting said S-polarized beam to said radiation source, and an auxiliary mirror for reflecting said second P-polarized beam passed through said polarizing beam splitter, toward said predetermined direction.

23. An apparatus according to claim 21, further comprising a projection optical system for projecting said image onto a predetermined plane.

24. An apparatus according to claim 22, further comprising a projection optical system for projecting said image onto a predetermined plane.

25. A projector comprising:
a radiation source;
a modulator for reflecting a polarized beam incident thereon and for generating a reflection beam indicative of an image by modulating the polarization state of said polarized beam incident thereon according to a video signal;
a converter including a polarizing beam splitter for splitting a beam from said radiation source into P- and S-polarized components, said converter generating said polarized beam by making the polarization directions of said polarized components parallel with each other, wherein said polarizing beam splitter is arranged in a path for said reflection beam so as to function as an analyzer; and
a projection optical system for receiving said reflection beam through said polarizing beam splitter and for projecting said image with said beam.

26. A projector according to claim 25, wherein said modulator has a liquid crystal panel.

27. A light modulating system, comprising:
a radiation source;
a modulator for reflecting a polarized beam incident thereon and modulating a polarization state of said polarized beam to generate a reflected beam; and
a converter including a polarizing beam splitter for splitting a beam from said radiation source into P- and S-polarized components, said converter generating said polarized beam by making the polarization directions of said polarized components parallel with each other wherein said polarizing beam splitter is arranged in a path for said reflection beam so as to function as an analyzer.

28. An image display apparatus comprising:
a radiation source;
a liquid crystal panel for generating an image by modulating a polarized beam having a predetermined polarization direction;
directing means for directing a beam from said radiation source to said generator;
wherein said directing means comprises a conversion optical system for converting the beam from said radiation source into said polarized beam; and
said conversion optical system includes a polarizing beam splitter for splitting the beam from said radiation source into a first beam and a second beam of mutually orthogonal polarization directions; and an arrangement of a ¼ wavelength plate and a mirror for changing the polarization direction of said first beam to generate a third beam of a polarization direction the same as that of said second beam and for directing said third beam to said polarizing beam splitter,
wherein said first beam is formed by reflecting one portion of the beam from said radiation source with a beam splitting surface of said polarizing beam splitter and said second beam is formed by transmitting an another portion of the beam from said radiation source through the beam splitting surface of said polarizing beam splitter, and
wherein said conversion optical system generates said third beam without redirecting said first beam to said radiation source and directs said second and third beams to said generator.

29. An image display apparatus comprising:
a radiation source;
a liquid crystal panel for generating an image by modulating a polarized beam having a polarization direction the same as a direction of liquid crystal molecules oriented at an incident side of said liquid crystal panel; and
directing means for directing a beam from said radiation source to said generator,
wherein said directing means comprises a conversion optical system for converting the beam from said radiation source into said polarized beam,
said conversion optical system includes a polarizing beam splitter for splitting the beam from said radiation source into a first beam and a second beam of mutually orthogonal polarization directions; and an arrangement of a ¼ wavelength plate and a mirror for changing the polarization direction of said first beam to generate a third beam of a polarization direction the same as that of said second beam and for directing said third beam to said polarizing beam splitter,
wherein said first beam is formed by reflecting one portion of the beam from said radiation source with a beam splitting surface of said polarizing beam splitter and said second beam is formed by transmitting an another portion of the beam from said radiation source through the beam splitting surface of said polarizing beam splitter, and wherein said conversion optical system generates said third beam without redirecting said first beam to said radiation source and directs said second and third beams to said generator.

30. An image forming apparatus comprising:
a radiation source;
a generator for generating an image by modulating a polarized beam; and
directing means directing a beam from said radiation source to said generator;
wherein said directing means comprises a conversion optical system for converting the beam from said radiation source into said polarized beam,
wherein said conversion optical system includes a polarizing beam splitter for splitting the beam from said radiation source into a first beam and a second beam of mutually orthogonal polarization direction; and an arrangement of a ¼ wavelength plate and a mirror for changing the polarization direction of said first beam to generate a third beam of a polarization direction the same as that of said second beam and for directing said third beam to said polarizing beam splitter,
wherein said first beam is formed by reflecting one portion of the beam from said radiation source with a beam splitting surface of said polarizing beam splitter and said second beam is formed by transmitting an another portion of the beam from said radiation source through the beam splitting surface of said polarizing beam splitter, and
wherein said conversion optical system generates said third beam without redirecting said first beam to said radiation source and directs said second and third beams to said generator.

* * * * *